US009826721B2

(12) United States Patent
Anderson et al.

(10) Patent No.: US 9,826,721 B2
(45) Date of Patent: Nov. 28, 2017

(54) APICULTURE

(71) Applicant: FlowBee Australia Pty Ltd, The Channon, NSW (AU)

(72) Inventors: Cedar Anderson, Broken Head (AU); Stuart Anderson, The Channon (AU)

(73) Assignee: FlowBee Australia Pty. Ltd. (AU)

( * ) Notice: Subject to any disclaimer, the term of this patent is extended or adjusted under 35 U.S.C. 154(b) by 267 days.

(21) Appl. No.: 14/362,446

(22) PCT Filed: Dec. 21, 2012

(86) PCT No.: PCT/AU2012/001589
§ 371 (c)(1),
(2) Date: Jun. 3, 2014

(87) PCT Pub. No.: WO2013/091018
PCT Pub. Date: Jun. 27, 2013

(65) Prior Publication Data
US 2014/0370781 A1   Dec. 18, 2014
US 2017/0245476 A2   Aug. 31, 2017

(30) Foreign Application Priority Data

Dec. 21, 2011 (AU) .................................. 2011905349
Feb. 2, 2012 (AU) .................................. 2012900368

(51) Int. Cl.
*A01K 47/04* (2006.01)
*A01K 59/00* (2006.01)
*A01K 47/02* (2006.01)

(52) U.S. Cl.
CPC .............. *A01K 47/04* (2013.01); *A01K 47/02* (2013.01); *A01K 59/00* (2013.01)

(58) Field of Classification Search
CPC ........ A01K 47/02; A01K 47/04; A01K 47/06; A01K 59/00; A01K 59/02
(Continued)

(56) References Cited

U.S. PATENT DOCUMENTS 890,397 A    1/1908  Avant
1,224,479 A *  5/1917  MacDonald ........... A01K 47/02
                                                    449/45

(Continued)

FOREIGN PATENT DOCUMENTS

EP    0921721 B1   9/2001
FR    2572623 A1   5/1986
(Continued)

OTHER PUBLICATIONS

European Search Report for Application No. 12859200.3, dated Jun. 26, 2015.
(Continued)

*Primary Examiner* — Lisa Tsang
(74) *Attorney, Agent, or Firm* — Cooley LLP

(57) ABSTRACT

An artificial honeycomb for use in a beehive and which enables honey to be removed from the honeycomb without removing the honeycomb from the hive, the honeycomb comprising cells and being formed of at least two parts which are moveable relative to each other between a cell formed position where the cells comprise side walls and an end wall to enable bees to fill the cell with honey, and a cell open position where at least some of the said walls have moved apart, whereby honey in the cells can be removed from the honeycomb by movement of the at least two parts to the cell open position.

13 Claims, 24 Drawing Sheets

(58) Field of Classification Search
USPC .................. 449/5, 35, 42, 44, 53–55, 63, 64
See application file for complete search history.

(56) References Cited

U.S. PATENT DOCUMENTS 2,223,561 A † 12/1940 Garriga
2,779,037 A * 1/1957 Rovira Mari .......... A01K 59/00
   449/5
3,303,519 A    2/1967 Jay
3,744,067 A    7/1973 Bentley
4,280,236 A    7/1981 Herman

FOREIGN PATENT DOCUMENTS

GB    460616 A    2/1937
GB    592090 A    9/1947

OTHER PUBLICATIONS

Ukraine Search Report for Application No. a 2014 08243, dated Oct. 6, 2015.

* cited by examiner
† cited by third party

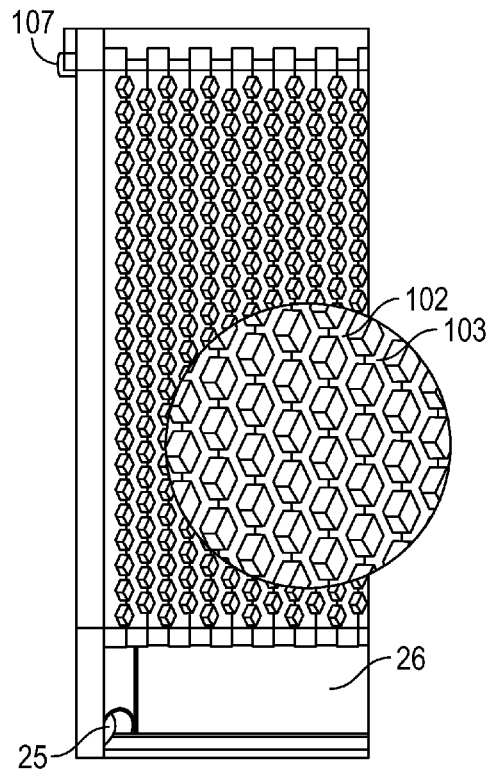
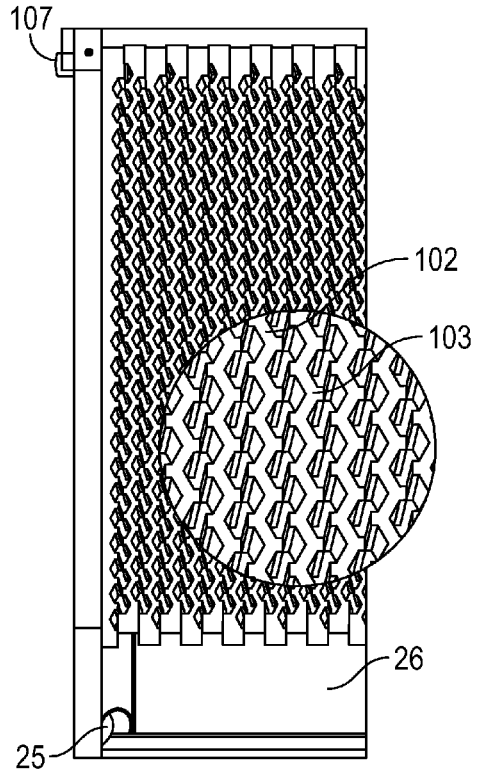
FIG. 15          FIG. 16
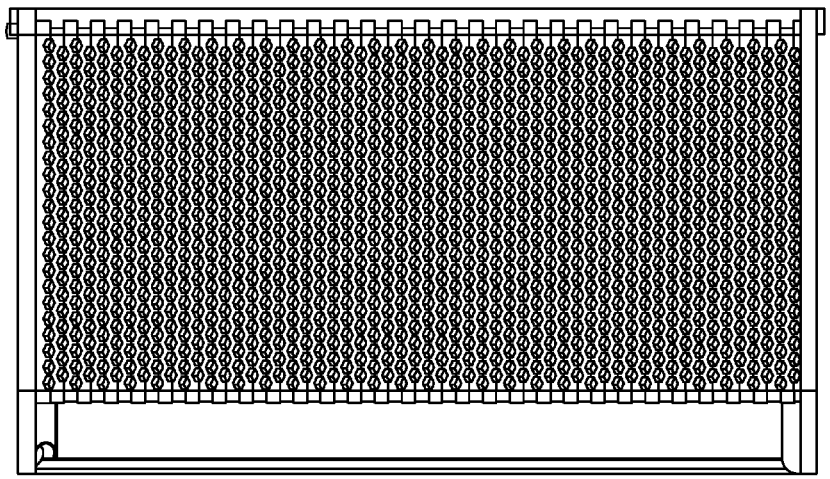
FIG. 17

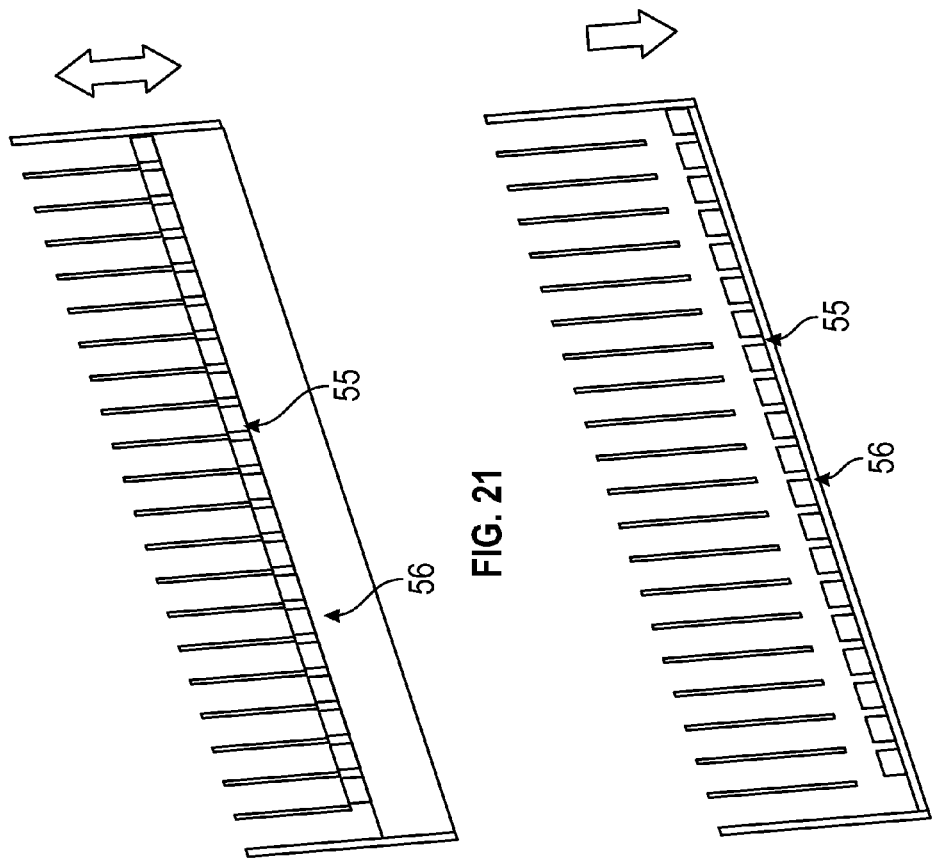
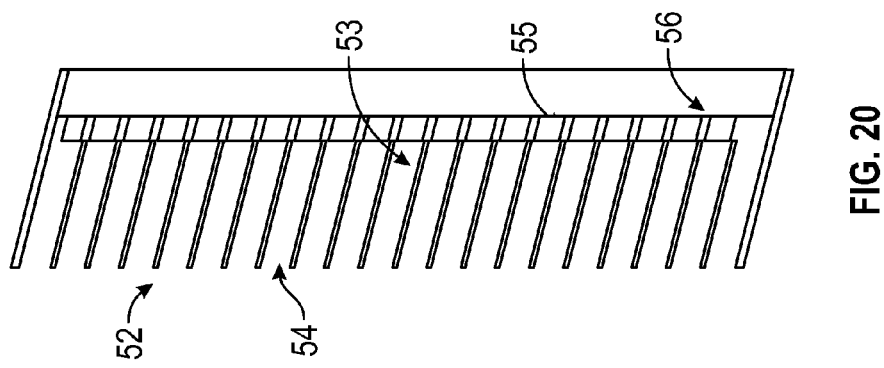

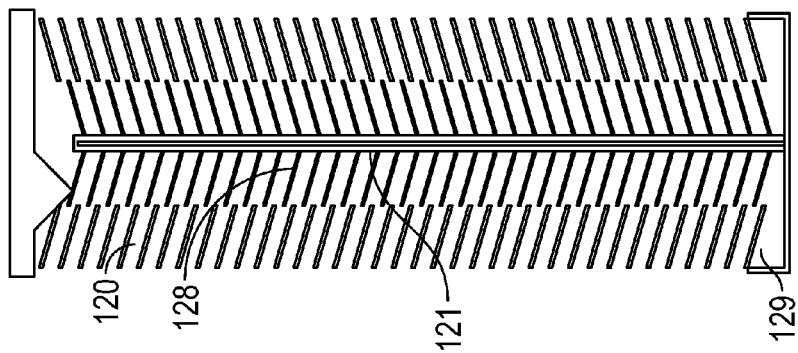
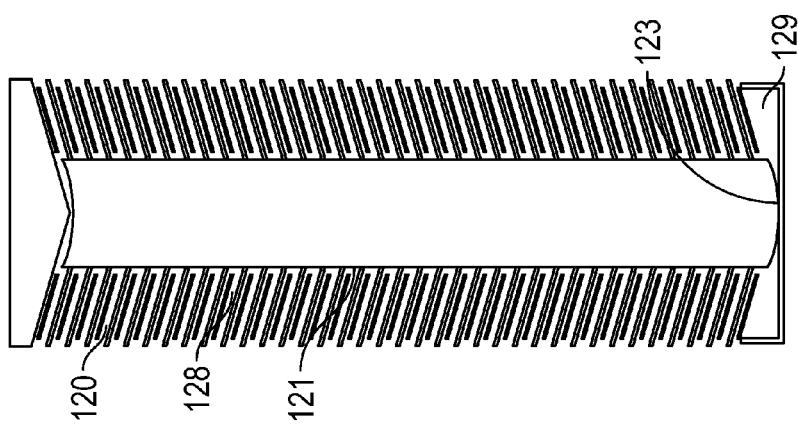
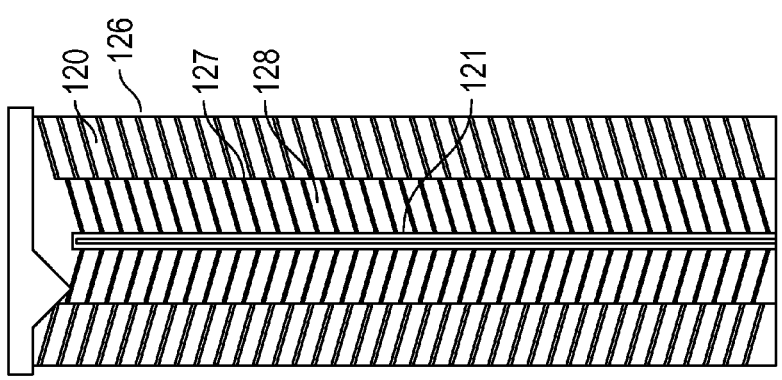

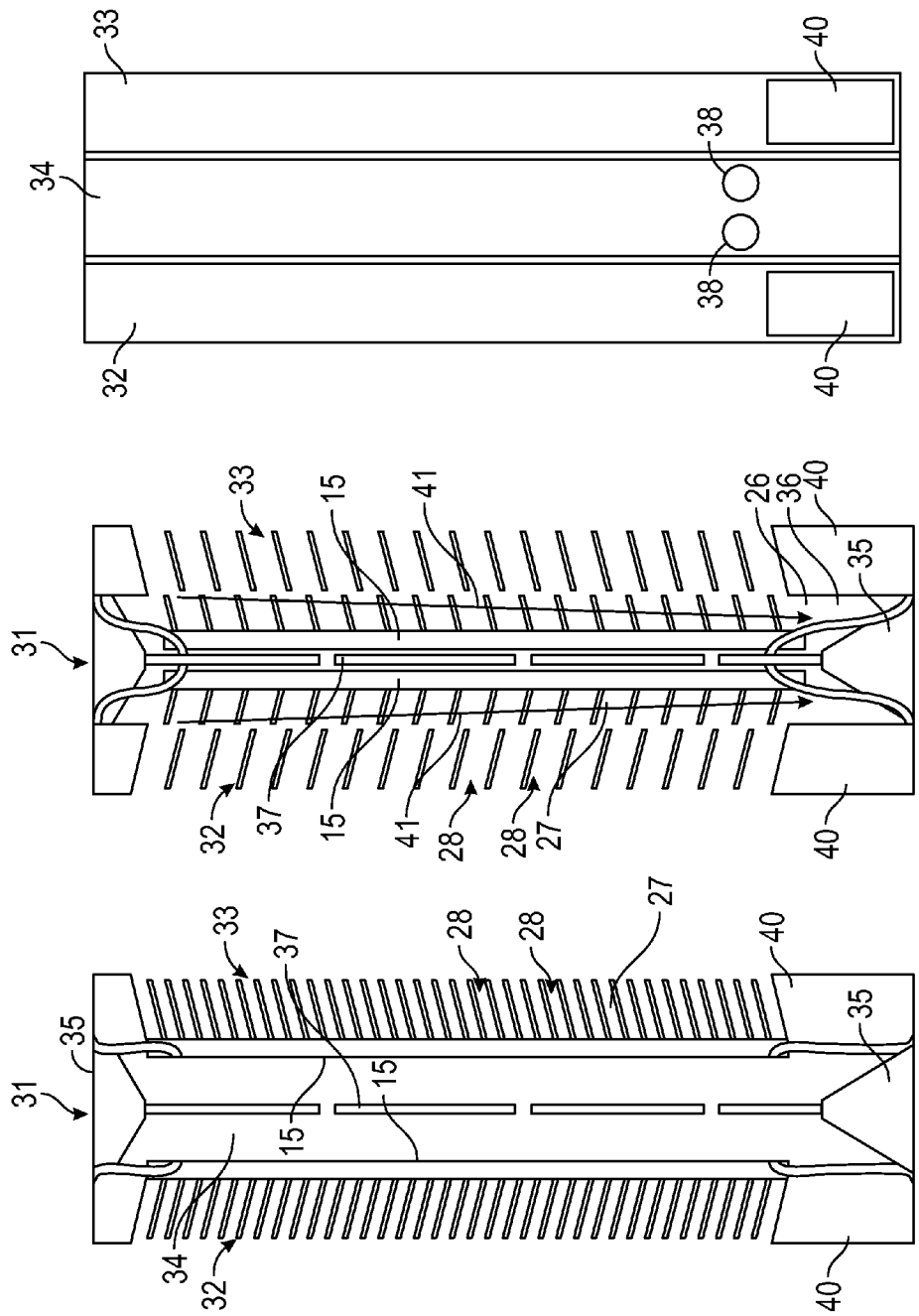

APICULTURE

TECHNICAL FIELD

The present invention is directed to improvements in the collection of honey from a hive and is particularly directed to improvements where honey can be collected without needing to remove honeycombs from the hive.

BACKGROUND ART

A modern beehive comprises various components which fit together to form the hive. Generally, these components will include:
  A Hive Stand. The upper hive components rest on this providing a landing board for the bees and helping to protect the Bottom Board from rot and cold transfer,
  A Bottom. Board. This has an entrance for the bees to get into the hive. This can be screened for ventilation and mite control,
  A Brood Box. This is the most bottom box of the hive and is where the queen bee lays her eggs,
  A Honey Super. These are the uppermost box(s) where honey is stored.
  Frames & Foundation. These are wooden or plastic frames with wax or plastic sheets with honeycomb impression where bees build wax honey combs, or pre formed plastic honeycombs.
  Outer Cover. This is the outermost housing to provide weather protection for the hive.
  Inner Cover. This provides separation from an overly hot or cold Outer Cover and can be used as a shelf for feeding or other purposes.

The honeycomb is a densely packed matrix of hexagonal cells. Bees use the cells to store food (honey and pollen). When a cell is filled, the bees place a wax cap over the end of the cell. The honeycomb is held in a frame which is usually rectangular. Several frames are placed next to each other in the upper part of the hive (the honey super). It is known to provide a plastic (usually polypropylene—but aluminium has also been used) honeycomb formed with the matrix of hexagonal cells. This relieves the bees of the effort required to build wax cells and gives the bees more time to collect honey. It is known to vary the shape and size of the cells in an artificial honeycomb.

Collection of honey can be very laborious and time consuming. As an example, a common way to collect honey requires the following steps to be carried out: A bee-proof suit needs to be donned; the lid of the hive is opened to expose the honey containing frames. The hive is smoked to calm the bees. A blower is sometimes used to remove bees from the frames. The frames are removed from the hive and transported to a processing center. The cells in the frame need to be uncapped by removing the wax cap. This can be done using an uncapping fork or an uncapping knife. The frames then need to be spun to remove the honey from the cells by centrifugal action. After the honey is removed, the frames are taken back to the hive and replaced (or new frames are inserted). It is estimated that the above time-consuming steps constitute approximately 90% of the bee-keepers time required to collect honey from the hive.

Another disadvantage with conventional collecting techniques is the expense required in the provision of a honey shed, an extracting machine, and sometimes an automatic decapping machine.

Another disadvantage is that the hive can be quite damaged during the honey collecting process (also called the robbing process). For instance, bees use 7 kg of honey to make 1 kg of wax.

Another disadvantage is that the existing process greatly disturbs the bees and many bees may die during honey collection. Also, there is always the annoyance (and sometimes potential danger) in bee stings during the robbing process of the hive.

Another disadvantage with the existing process is that the hive can only be robbed at certain times such as daylight, no rain, no high winds, etc and therefore there are often restrictions and limitations on the times when the hive can be opened to collect the honeycombs.

Another disadvantage is that traditional hives leave spaces for pests and diseases.

Honey in the cells is held in place by the wax cover (cap) placed over the cell mouth by bees and also by the viscosity of the honey. Thus even if a way was found to remove the wax cap in a simpler manner, the honey would still not easily drain from the cells. This is why the frames need to be transported to a factory which has a centrifuge to spin the honey out of the cells once the cap has been removed.

It is known to build a hive of special design and to suck honey out of the hive using a suction pump. The mechanism is quite complex as each frame has a dislodgeable plate on which the bees make their wax cells. When the honeycomb is full, the plate is moved to break part of the wax cell wall. However, due to the "sticky" nature of the honey, the honey does not drain from the cells and into a honey trough. Thus a suction pump is required to suck the honey out. The cells of the honeycomb are not artificial and instead are made by the bees. Also the wax is quite fragile and the above method is unlikely to work without breaking the wax combs.

A more recent variation has a honeycomb formed with a backing plate closing off one end of the cells. Bees will fill the cell with honey and close off the other end with wax. The backing plate can be dislodged in the hive and in theory honey should flow from the cells by gravity and into collecting trays and pipes to flow from the hive. In practice, the honey does not readily drain due to the viscosity of the honey in the cell.

It is known to provide heating in an attempt to decrease the viscosity of the honey and therefore to improve the honey flow characteristics. However, these known techniques can also heat the bees in the hive which is undesirable.

It is known to transport beehives from one location to another location. With the general demise of bee numbers in agricultural areas, it is becoming more common for farmers to request beehives to be placed on their farms to improve pollination. A required number of beehives are lifted into a trailer (or similar) and then transported (typically by road transport) to a desired position. The hives are then unloaded from the trailer and placed on the ground (or on a stand) for the desired time which can be several weeks or several months. There would be an advantage if it were possible to provide a less physically demanding and time-consuming method to conduct this.

It is an object of the present invention to provide an apparatus and method to remove honey from a hive which would overcome at least some of the abovementioned disadvantages or provide a useful or commercial choice. A preferred object is to enable honey to be removed from a honeycomb without needing to remove the honeycomb from the hive.

Any references to methods, apparatus or documents of the prior art are not to be taken as constituting any evidence or admission that they formed, or form part of the common general knowledge.

SUMMARY OF THE INVENTION

According to a broad aspect of the invention there is provided an artificial honeycomb for use in a beehive and which enables honey to be removed from the honeycomb without removing the honeycomb from the hive, the honeycomb formed of at least two parts which are moveable relative to each other between a cell formed position where the cells comprise side walls and an end wall to enable bees to fill the cell with honey, and a cell open position where at least some of the said walls have moved apart, whereby honey in the cells can be removed from the honeycomb by movement of the at least two parts to the cell open position.

Alternatively, there may be provided an artificial honeycomb for use in a beehive and which enables honey to be removed from the honeycomb without removing the honeycomb from the hive.

The plastic honeycomb cell matrix is formed of at least two parts which are moveable relative to each other. These comb sections can be moved to two different positions; a cell formed position where the cells comprise side walls and an end wall to enable bees to fill the cell with honey, and a cell open position where the said walls have moved apart, whereby honey in the cells can drain-from the honeycomb.

The at least two parts are preferably movable between the two positions such the cells can be formed and opened and then reformed and re-opened etc. This enables the honeycomb to be drained multiple times while remaining in the hive.

The honeycomb can be any suitable shape and size. It is envisaged that the honeycomb will be substantially rectangular as this is a traditional honeycomb shape. However, there may be circumstances where it is desirable for the honeycomb to have other shapes which may include more rounded shapes, polygonal shapes, 'natural comb' reverse catenary arches, or irregular shapes.

The size of the honeycomb will typically be to suit a particular beehive size. As an example, it is envisaged that the honeycomb will have a length of between 30-100 cm and a width of between 20-50 cm although this can vary to suit. It is also envisaged that the honeycomb will have a thickness of between 10-100 mm although this can also vary to suit and it should be understood that no unnecessary limitation should be placed on the invention merely by the exemplification of certain desirable dimensions. The cell size can also vary and the cell size may include at least from 4.6 mm to 6 mm, or even larger, as the larger cell sizes will make the honey drain more easily.

The honeycomb may be made of any suitable material. It is preferred that the honeycomb is of artificial manufacture and may be manufactured from any suitable material. It is envisaged that plastics will be a suitable material and it is envisaged that polypropylene may be a suitable plastics. However, other plastics material may also be suitable including polyethylene, low-density polyethylene, high-density polyethylene, and other types of thermoplastic material, food grade plastic materials, thermo-setting plastics materials, nylons, polycarbonate, polyvinyl chloride, polystyrenes, ABS plastic, and the like. Alternatively, the honeycomb may be made of certain types of metals which may include aluminium. The honeycomb material may be made of composite materials, coated materials, filled materials, reinforced materials (for instance fibreglass), and the like. It is also envisaged that there may be circumstances where the honeycomb will be made of laminate materials and the like. The honeycomb may be made of different types of materials. The honeycomb may comprise separate parts which are attached together for instance with the use of adhesive, plastic welding, fasteners and the like. It is not considered that any unnecessary limitation should be placed on the material from which the honeycomb is manufactured merely by the exemplification of certain possibly preferable materials.

The honeycomb according to one aspect of the invention contains a first part and at least one further part which can move relative to each other between a cell forming position and a cell breaking position. It is preferred that the honeycomb comprises a first part and a second part which can move between the said positions. However, there may be circumstances where the honeycomb can comprise the first part, a second part and a third part (or even more parts) which can come together between the cell forming position and the cell breaking position; however it seems that a preferred embodiment of an aspect of the invention can be achieved by requiring only two parts for each cell.

Various aspects of the invention are envisaged. A first aspect of the invention is envisaged where the honeycomb is formed of at least two parts, each part comprising part of a cell wall, the parts being slideable relative to each other between a cell broken position and a cell formed position. This aspect of the invention may be termed the "vertical separation method".

As the honeycombs are typically positioned in a vertical manner in the hive, the sliding movement can be a vertical (or up and down movement), an example of which is illustrated by arrow 100 in FIG. 30.

The honeycomb may comprise two parts as opposed to three or more parts. Each part may comprise half of the sidewall of the cells. Each part may contain part of the rear wall of the cell, and it is especially preferred that each part has half the rear wall i.e. the rear wall of the cell is split down the center. FIG. 13 illustrates a non-limiting embodiment of this feature namely the two part vertical separation honey, comb in a closed position. FIG. 14 shows the honey comb of FIG. 13 in an opened configuration.

There may be circumstances where it is desirable for the cell wall to be partially incomplete so that the bees can complete the cell structure with wax. The precise wall or walls which are incomplete may vary, but suitably comprise part of the side wall of the cell. FIG. 7 illustrates a non-limiting example of an incomplete cell wall structure, and this will be described in greater detail below.

The sliding movement may be performed by any suitable means including by manual means, mechanical means, electrical means, pneumatic means, magnetic means and the like and thus the movement may employ cogs, levers, cam, worm gear, motors, magnetics etc.

The sliding movement can be used to open the cells to enable honey to be drained.

There may be circumstances where it is desirable to leave the front (mouth) of the cell unbroken when sliding the comb parts to break the cells apart. This allows the comb to be drained while keeping the wax cap intact. When the comb is drained and the parts are moved back to the cell formed position, the bees can remove the wax capping to refill the cell with honey. FIG. 4 illustrates an example of a two part honeycomb where one part comprises the entire hexagonal edge of the mouth of each cell, and which will be described in greater detail below.

To assist honey removal from the comb, heat may be applied. In one form heating elements may comprise part of the cell sidewall and/or rear wall, or imbedded into the side or rear wall to warm the honey. Heating could also be achieved by passing hot fluid or air through channels in the comb or by passing warm air through the honey super in such a way that the bees and particularly the brood nest are not harmed While an aspect of the invention has been described with reference to a honeycomb having a first part and a second part which can move together or move apart to form or break the cell wall, there are further aspects of the invention which can also enable honey to be removed from a hive without needing to open the hive and remove the honeycombs.

Various additional aspects are envisaged by which the object of the invention be achieved. Briefly, a second aspect of the invention is envisaged where the end wall of each cell comprises a piston head and the cell wall can slide relative to the piston head to "pump" the honey from each cell. This aspect can be identified as the "piston" aspect.

Therefore, according to the second aspect of the invention (i.e. the "piston" aspect) there is provided a honeycomb comprising a plurality of cells which comprise a front section, a main body section and a rear wall, the main body section adapted to be filled with honey by bees, the front section adapted to be capped by bees, the front section and the main body section being moveably relative to each other between a connected position where the front section and the main body section form part of a cell, and a disconnected position where the front section and the main body section are separated relative to each other, the rear wall comprising part of a piston member, the main body section and the rear wall being movable relative to each other between a retracted position where honey can be placed in the main body section and an extended position where honey expelled from the cell by the piston member.

In some embodiments of this aspect the pistons may move forward sufficiently to rupture capping instead of the break away comb at the mouth of the cell.

A non-limiting example of this aspect of the invention is illustrated at least in FIG. 18 and FIG. 19.

In this manner, the honeycomb can be filled with honey in the usual manner with bees inserting honey into main body section of the cells. When a particular cell is filled with honey, bees will cap the cell by adding wax over the front section. When honey is to be collected, the main body section and the front section can be separated to open the front of each cell in a manner that does not require separate scraping of the capping from the cells. The main body section and the rear wall can then be moved relative to each other to pump the honey from each cell out through the front of the main body section which is now open because the front section (containing the wax) has been moved away from the front of the main body section.

It is preferred that the arrangement is such that when the main body section is moved away from the front section, this also results in the rear wall (which can comprise a piston head) moving along the main body section to push the honey house of the main body section. Thus, a single action can be used to remove the wax cap from each cell (by separating the front section from the main body section) and removing the honey from each cell (by pushing the honey out of the main body section).

It is also preferred that the arrangement is such that when the front section and the main body section are separated, this forms a passageway along which expelled honey can flow towards a collection area or an outlet.

Preferably, the arrangement is such that the front section and the end wall are fixed in position and the main body section can move between a first position (which can be called the filling position) where the front section and the main body section are together and the end wall is retracted and where honey can be placed in each cell, and a second position (which can be called the extracting position) where the main body section has been pulled away from the front section this movement also causes the main body section to move relative to the end wall causing honey to be extracted from each cell.

The honeycomb may comprise an assembly. The assembly preferably comprises a first array of honeycomb cells facing one direction and a second array of honeycomb cells facing the generally opposite direction. The rear wall of one said array suitably faces the rear wall of the other said array. Thus, in a preferred embodiment the honeycomb assembly comprises a centralised portion containing the rear walls of each of the array. The rear walls typically comprise a plurality of pistons which can be fixed to a backing member or a support member with the number of pistons being such that each cell has an end wall which comprises a piston. The main body section of each array can suitably move relative to the piston between the connected position and the disconnected position and also the retracted position and the extended position.

In the honeycomb assembly it is preferred that the main body section is the only section that moves and therefore the front section and the piston are fixed.

The movement is preferably a linear movement and most preferably a reciprocating movement to enable the honeycomb to be selectively moved between the "filling" position and the "extracting" position.

The movement can be achieved by any suitable means. For instance, it is envisaged that the main body section can be moved manually. However, it is more preferred that the movement is a mechanical force and this may comprise cogs, threads, levers, a motor, hydraulic, or pneumatics. Vacuum may be applied to the assembly to facilitate removal of the honey both where this aspect of the invention and also in relation to each of the other aspects discussed herein.

A third aspect of the invention is envisaged where the end wall of each cell comprises a short piston/plug which can be pulled back to open this end of the cell to enable honey to be removed from the honeycomb, and can also be moved forward a little to rupture the capping. This aspect can be identified as the "plug" aspect.

In this third aspect, which for convenience can be identified as the "plug" aspect" of the invention there is provided a honeycomb comprising cells having an open front and a rear end containing a plug which can be removed to allow honey to flow through the rear end of the cell.

In this third aspect of the invention, the cells are "plugged" at one end and the plugs pass at least partially into each cell. This is in contrast to a simple end plate which closes off the ends of each cell but which does not appreciably enter part of each cell.

A non-limiting example of the third aspect of the invention is illustrated at least in FIGS. 20-22.

The plug may comprise a piston which preferably comprises a short piston. The piston may be insertable into the rear end of the cell and can move between a first position where the piston is in one end of the cell, and a second position where the piston is retracted from the cell to enable honey to flow through the rear end.

The piston may extend only partially within the cell such that the cell can still be filled with honey when the piston is in the first (inserted) position. Thus, it is envisaged that the piston will extend only in the rear portion of each cell, and typically along between 5-20% of the cell length.

A connecting member may be provided to connect the pistons in each cell of the honeycomb. The connecting member may comprise a backing plate. The backing plate may be movable between the first position where the pistons are inserted into the rear of each cell, and the retracted position where the pistons are removed from the rear of each cell.

In order to break the capping the short pistons may move toward or away from the comb, this causes the honey to move thus rupturing the capping. Then the back plate and pistons can move away from the comb providing a path for the honey to drain.

The honeycomb may be constructed in such a manner to provide a pathway for the honey to enable the honey to flow under the influence of gravity to a collection area. In one form, this can be achieved by inclining each cell to facilitate the flow of honey from the cells when the cells have been opened.

A fourth aspect of the invention is envisaged which comprises a backing plate to cover one end of each of the cells and where the backing plate can be pulled back to open the cells to enable honey to be drained from the honeycomb. This aspect can be identified as the "split back" aspect.

According to the fourth aspect of the invention, which may conveniently be identified as the "split back" aspect, there is provided a honeycomb comprising cells where a rear part of the cells are closed by a backing member, the backing member being operable between a closed position closing the rear part of the cells, and a breakaway position where the backing member is spaced away from the rear part of the cells to enable honey to flow out of the rear part of the cells.

A non-limiting example of this aspect of the invention is illustrated at least in FIG. 24 and FIGS. 25A to 25C.

The honeycomb may be tilted such that the cells are in a substantially vertical or upwardly inclined orientation to assist in drainage. This can be achieved by tipping the honeycombs in the hive, for instance by tilting the hive or tipping the hive to one side.

The backing member may comprise a plate or board and the backing member can be moved by any suitable means including manual, mechanical, hydraulic or pneumatic means.

Referring to FIGS. 26-28, there is described a preferred embodiment according to a fifth aspect of the invention which can be referred to as the "spike method". FIG. 26 illustrates the comb filled with honey and capped. FIG. 27 illustrates the spikes pushed into the cells to break the wax bottom and capping. FIG. 28 illustrates the spikes pulled out of the cells allowing honey to flow down through the spikes to the honey drain.

This method can use a back plate 121 that has an array of spikes 128, one for each honey cell of plastic honey comb 120. The bees wax the rear of the cell 127, fill with honey and cap the cell 126. To extract, the back plate and spikes move into the cells thereby breaking the wax bottom and the cap. The back plate and spikes then pull back allowing the honey to flow down through the spikes 128 and out a honey drain hole 129 and into a manifold like in previous methods. This spike method could also be used on the tilt style hive with one sided honeycombs. The back plate and spikes can be moved with a diaphragm 123 or other mechanical methods detailed previously.

The brood box contains frames that have complete cells that don't come apart. These can be made of plastic or wax.

A sixth aspect of the invention is envisaged where the side walls of the cells can be opened up to enable honey to be drained from the cells. This aspect can be identified as the "split walls" aspect.

According to the sixth aspect of the present invention there is provided a honeycomb comprising a first part defining a portion of a side wall of a cell and at least one further part defining another portion of the side wall of the cell, the first part and at least one further part being moveable between a cell forming position, where a cell side wall is formed and a cell breaking position where the cell side wall is broken.

The sixth "split walls" aspect of the present invention may provide a honeycomb comprising a first part defining a portion of a side wall and base of a cell and at least one further part comprising the remaining portions of walls of the cell. The first part being moveable between a cell forming position, where complete cells are formed and a cell breaking position where the cell side walls are broken.

The "breaking" of the cell wall now allows honey to drain as the honey can no longer be contained by the cells. The breaking action also breaks the wax cap on each cell, so a separate de-capping action is no longer required. The honeycomb design breaks the side wall of the cells opening the cells along their length enough to allow honey to flow out in a downward lateral direction to the cells, for the depth of the cells. This is in contrast to earlier arrangements which opened the end wall of the cells, which kept the side walls intact and resulted in honey drainage difficulties.

The parts of the honeycomb can be moved back to the cell forming position after the honey has been drained to "reform" the cell side wall(s) and to allow bees to refill the cells with honey.

The honeycomb can remain within the hive while it is moved between the cell forming position and the cell breaking position and therefore allows honey to be drained from the hive without needing to remove each honeycomb from the hive which is the traditional method of honey removal.

The first part and the at least one further part together can define the cell side wall. The cell side wall will typically be hexagonal which is the typical shape of a honeycomb cell. There may be circumstances where it may be desirable for the cell to have a different shape, for instance an octagonal shape, oval shape, round shape, and the like. However the invention can be carried out with the cell having a hexagonal shape and this will be referred to throughout the specification.

Thus, the cell side wall will typically be hexagonal and will therefore have six side wall portions attached to each other to form the hexagon. The first part of the honeycomb according to an aspect of the present invention can comprise one or more of the six sidewalls and the at least one further part (preferably a second part) can comprise the remaining sidewalls of the cell such that when the parts come together, a complete (typically hexagonal) cell is formed.

A typical honeycomb can have many thousands of cells, and will typically have about 3500 cells per side. Suitably, the honeycomb according to one aspect of the invention comprises two main parts which come together to form a completed honeycomb having thousands of cells. Thus, the first part can comprise one or more sidewalls of each cell in the honeycomb and the second part can comprise the remaining sidewalls of each cell in the honeycomb.

A non-limiting example of this is illustrated at least in FIG. 41 which shows a small piece of a honeycomb and particularly illustrating the two parts with each part defining part of the cell walls of the honeycomb. Another non-limiting example is illustrated at least in FIG. 32. These two parts can come together to form a complete honeycomb a non-limiting example of which is illustrated in FIG. 31.

It is preferred that the honeycomb according to an aspect of the present invention comprises cells having an open end (into which bees can insert honey and ultimately the bees will cap the open end with wax), a side wall which may be as described above, and a closed end. In one aspect of the invention the closed-end remains closed and therefore may form part of, or be fixed to, the first part. It is envisaged that the closed end wall may comprise a plate like member, backing member or something similar to close off one end of each of the cells in the honeycomb. A non-limiting example of this is illustrated as reference numeral 15 in at least FIG. 32.

Suitably, the first part defines approximately half the sidewalls of the cell and the second part defines approximately half the sidewalls of the cell. Preferably, a tapered version has about 30% of the side wall on the back half. If the cell is hexagonal, the first part may define three walls of the cell and the second part may define the remaining three walls of the cell. Of course, if the cell has a different shape, the first part and the second part may define different shapes.

If the first part includes an end wall (for instance, 15 in FIG. 32), this can provide strength and robustness to the sidewalls of the cell defined by the first part as the sidewalls can be attached to the end wall to provide strength and rigidity. The second part will typically not contain an end wall as the second part will typically define the open front of the cell through which bees can place honey into the cell. Thus, to provide strength to the second part, it is preferred that the second part defines side wall parts which interconnect adjacent cells. A non-limiting example of this is illustrated at least in FIG. 41 which illustrate "interconnecting" walls 16, to provide strength to the entire second part of the honeycomb. However, it is also envisaged that the second part will not be provided with interconnecting walls and a non-limiting example of this alternative is illustrated in FIG. 46. Therefore, while it is preferred that the second part comprises interconnecting walls, it is not considered that the invention should be unnecessarily limited to this type of structure.

The size of each cell in the honeycomb can vary. It is envisaged that the cell size will be typical of that found in commercially available honeycombs.

A preferred aspect of the invention has the first part and the at least one further part (typically a second part) being movable relative to each other. Suitably, the parts can "mesh" together and be pulled apart to respectively form the cells and to break the cells. It is envisaged that one of the parts will be fixed in place and the other part (or parts) will move between the cell forming position and the cell breaking position. However, there may be circumstances where it is desirable that all the parts can move between the said positions.

Preferably, the honeycomb will have the first part being movable and the second part being fixed, the first part typically containing the closed end wall and the second part containing the open end of the cell. It is envisaged that the movement will be a linear movement and it is particularly envisaged that the movement will be a reciprocating movement between the cell forming and the cell breaking positions. Thus, in a preferred embodiment, the first part can be retracted and advanced relative to the second part between the cell breaking and the cell forming position.

A non-limiting example of this is illustrated in FIG. 44 which illustrates the first part and the second part in the cell forming position and FIG. 45 where the first part (which in FIG. 45 is behind the second part) has been retracted to open (break) the cell sidewalls. It can be seen in this non-limiting example and especially in FIG. 45 that large openings have now been formed and honey (not illustrated) in the cells can readily drain from the honeycomb.

The first part and the second part can be moved by any suitable means. For instance, the first part and the second part may be moved manually between the cell forming position and the cell breaking (honey draining) position. However, this may require opening of the hive to access the various honeycombs and to manually separate the first part from the second part.

Therefore, it is preferred that the first part and the second part are moved in an automated manner. It is particularly preferred that the parts can be separated pneumatically and particularly by the application of a vacuum. For example a vacuum pump may be connected to bring the parts together and apart so that the vacuum pump effectively operates as an actuator.

Other forms of actuator are possible, for example, some form of motor mechanism may be provided to enable the parts to be separated and bought together upon activation of the motor. The motor may comprise an electric motor. However, this may require batteries, electric wiring and maintenance of the motor and other parts and accessories.

Accordingly, an embodiment of the invention encompasses a beehive including a number of honeycombs as previously described, the beehive further including controllable actuators associated with each said honeycomb arranged for bringing each said honeycomb from a cell closed position to a cell open position for drainage of the honey; and a weight sensor for monitoring weight of at least a portion of the beehive indicative of honey level in the beehive wherein the controllable actuators are responsive to the weight sensor to assume a cell open position for drainage of honey from the beehive upon attainment of a predetermined honey level.

Suitably, the honey super part of the hive comprises a plurality of honeycombs with each (or at least some and preferably most or all) of the honeycombs being of the type generally described in the present specification. The honeycombs may be positioned in a side-by-side spaced and generally parallel relationship. Suitably, adjacent honeycombs are positioned such that the first part of one honeycomb faces the first part of an adjacent honeycomb.

Suitably, this part (at least) of the hive can be formed such that a low-pressure area (e.g. vacuum) can be formed in the spacing between adjacent honeycombs and the vacuum can cause the first part of each of the two adjacent honeycombs to retract thereby enabling honey to be drained.

A sealing means may be provided to enable a low-pressure area (behind the comb) to be maintained. The sealing means may comprise sealing members such as food grade silicone or latex diaphragms or any other type of suitable sealing means or sealing members.

The hive and particularly the housing super may be provided with a number of honeycombs with the special design generally mentioned above. In particular, each honeycomb unit can comprise an assembly of separate honeycombs. The assembly preferably comprises a pair of outwardly facing honeycombs which are spaced apart sufficiently to enable honey to flow out of the assembly. The spacing can vary but it is envisaged that the spacing will be between 4-100 mm and preferably from 4 to 12 mm between comb faces. Each honeycomb is preferably of the type described and therefore comprises a first part and a second part.

The first part preferably contains an end wall (an example of which is illustrated as reference numeral 15 in FIG. 32).

Each of the pair of honeycombs in the assembly is positioned in a side-by-side and generally parallel relationship with the end wall of one honeycomb facing the end wall of the other honeycomb. The assembly can contain sealing means such that when a vacuum is applied in the spacing between the adjacent honeycombs, this can cause the first part to be retracted relative to the second part thereby opening the cells to enable honey to be drained therefrom. Conversely, this area can be pressurised to cause the first part to move back to the original position where the cells are formed.

A plurality of such assemblies can be provided in each hive. For instance, each hive (and particularly the housing super part of each hive) may be provided with between 2-10 or even more of such assemblies with each assembly comprising at least a pair of honeycombs generally as described above.

Another advantage of the present invention is that the hive design can change substantially from the traditional box with removable frames. The whole hive may be made of the same molded material as the honeycomb sections and be built in such a way to minimize spaces for pests such as moths and beetles to breed. Traps for pests can also be built into the molded hive design. It is envisaged, but not limited to, that each of the honeycomb assemblies will be able to be removed from the hive 'box' for maintenance or replacement.

To facilitate draining of the honey, the viscosity of the honey can be reduced by circulating or blowing warm or hot air into the honeycomb assembly. The air can be blown into the spacing between adjacent honeycombs of the assembly once the first part has been retracted by initially lowering the pressure (or by some other means to retract the first part). More preferably the warm air may be circulated prior to retraction or both prior and subsequent to retraction. The warm or hot air can then circulate through the cells to warm the honey to improve drainage. This arrangement warms only the honeycomb assembly where the honey is stored and warm or hot air can be kept away from the bees in the brood box or in other parts of the hive. This may be an advantage of this construction of the invention.

The assembly can further comprise a lower collection area for honey which may be in the form of a honey trough a non-limiting example of which is illustrated as reference numeral 26 in FIGS. 30 and 12. The lower collection area can communicate with the exterior of the honeycomb assembly such that honey can be removed from the assembly.

A plurality of hives may be placed in a particular location with each hive containing the honeycomb assembly generally as described. The hives can be provided with at least one opening for the honey to be drained from the hive. A manifold can be provided to interconnect the plurality of hives such that the honeycombs can be drained into a common honey tank.

Similarly, a further manifold may be provided to enable the air pressure in the spacing between adjacent honeycombs to be reduced or increased (to retract or extend the first part of the honeycomb), and the manifold may be connected to a common pneumatic pump. A non-limiting example of this is illustrated in FIG. 11.

A further advantage of this aspect of the invention is that a plurality of hives can be mounted onto a vehicle trailer (see for instance FIG. 40) and the trailer can be towed to a suitable location and then parked for however long it takes for the bees to collect the honey and to fill the honeycombs in the hive. The hives can then be drained in a manner which is less labour intensive than hitherto possible. An automated system could be triggered when a particular hive reaches a certain weight and so the whole trailer full of hives can be automatically 'milked' of honey which can be stored in a connected 'tanker' trailer for easy transport.

Each aspect of the invention and the invention as broadly defined also envisages the ability to automate the robbing of each hive and to connect a number of hives together in such a manner that honey from each hive can be drained to a common honey tank and the automation of each hive can be controlled centrally.

According to one embodiment of the invention there is provided a plurality of hives comprising at least one honeycomb as previously described and including a plurality of honey drainage conduits coupled between a honey drainage point on each hive and a central collection point; a remotely controllable actuator associated with each said honeycomb and arranged for bringing each said honeycomb from a cell open position to a cell closed position for drainage of the honey; and a remotely readable level sensor arranged to monitor a honey level for the central collection point; whereby a remote operator may initiate draining of the honey from the hives and collection of the honey in response to a signal from the remotely readable level sensor.

Embodiments of the invention enable honey to be extracted from a hive without requiring removal of the honeycomb, scraping the capping away, and then removing the honey using centrifugal equipment as has been the general approach in the past.

As bees begin to fill the cells with honey, the honeycomb will become heavier. Therefore, a weighing means may be associated with the honeycomb in each aspect of the invention and when the honeycomb has achieved a minimum weight or a predetermined weight consistent with the honeycomb being substantially full of honey, this can trigger operation of the honeycomb to drain honey from the hive. For example an output of the load cell may be wired to an input of an actuator arranged to bring two halves of the comb to an open cell configuration for draining the honey. That is, the actuator is responsive to a signal from the load cell upon the load cell detecting a predetermined weight indicative of the hive being replete with honey. This can result in substantial automation of the entire system. The weighing means may comprise one or more load cells which may be positioned under the honey super of the hive and/or under the whole hive, although other alternatives are also envisaged.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 1-17 illustrate a first aspect of the invention (the vertical separation aspect)

FIGS. 20-22 generally illustrate a third aspect of the invention (the plug or short piston version)

FIGS. 26-28 generally illustrate a fifth aspect of the invention (the spike version)

FIGS. 29-46 generally illustrate the sixth aspect of the invention (the split walls or two-part version)

Referring now more specifically to the various aspect of the invention:

First Aspect

Figure 1:
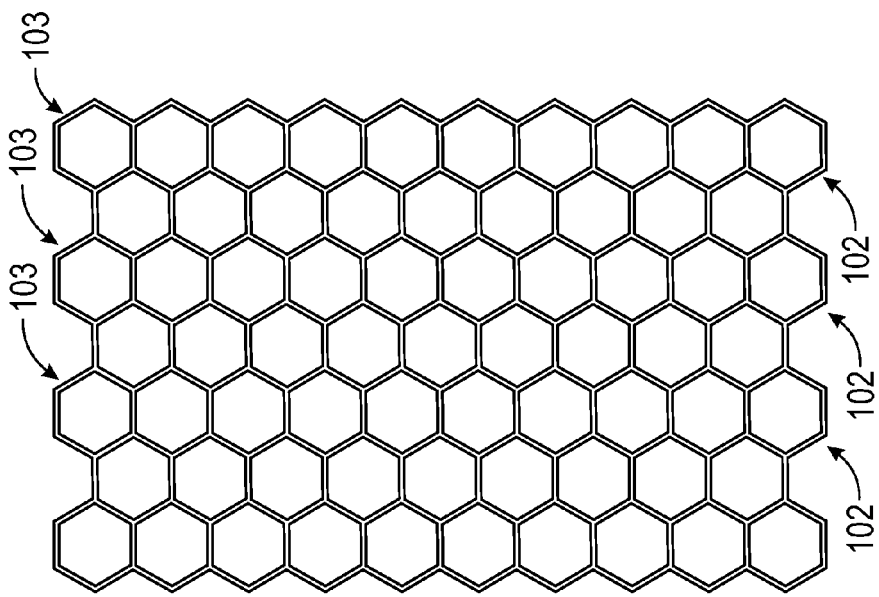

FIG. 1. Illustrates a two part comb in the cell formed position.

Figure 2:
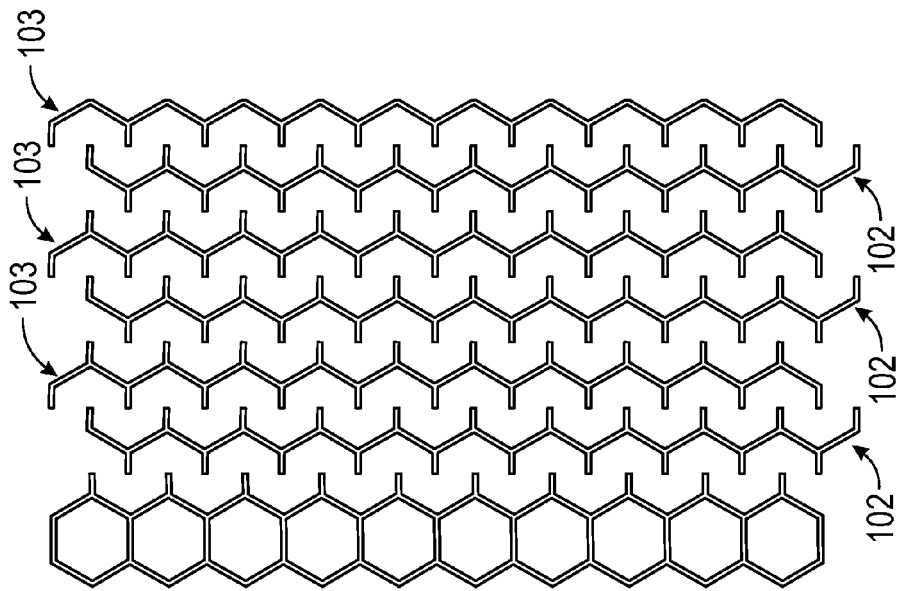

FIG. 2. Illustrates the comb of FIG. 1 in the cell broken "honey draining" position.

Figure 3:
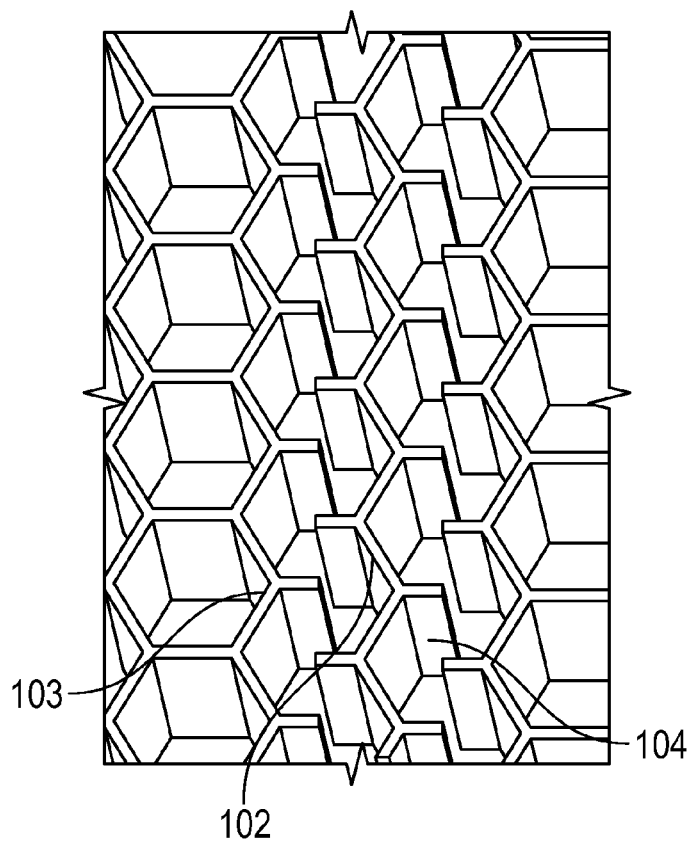

FIG. 3. Illustrates one row of cells in the cell broken position.

Figure 4:
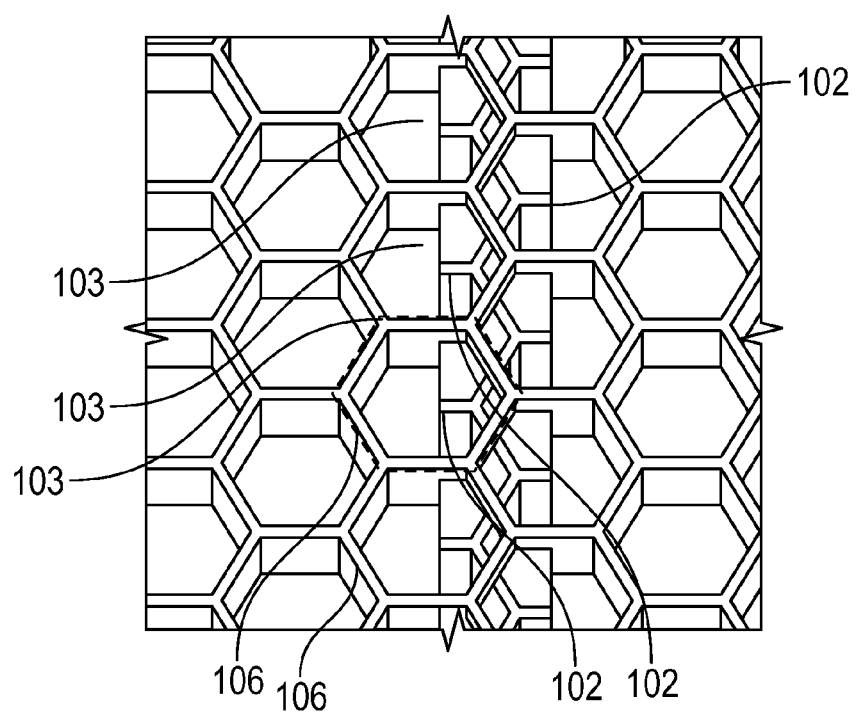
Figure 6:
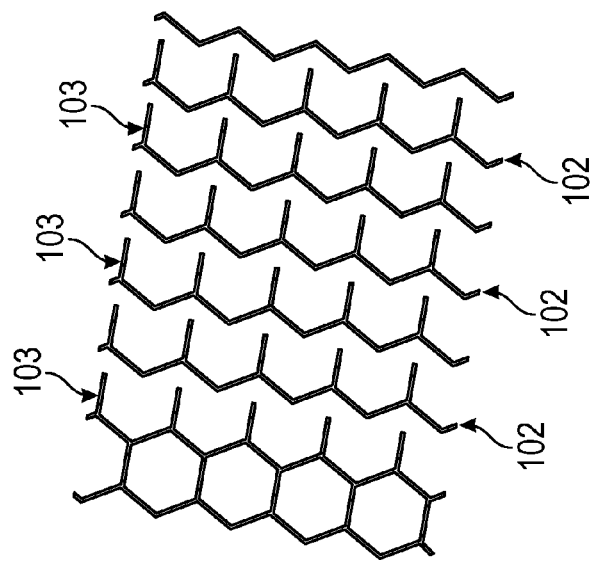
Figure 5:
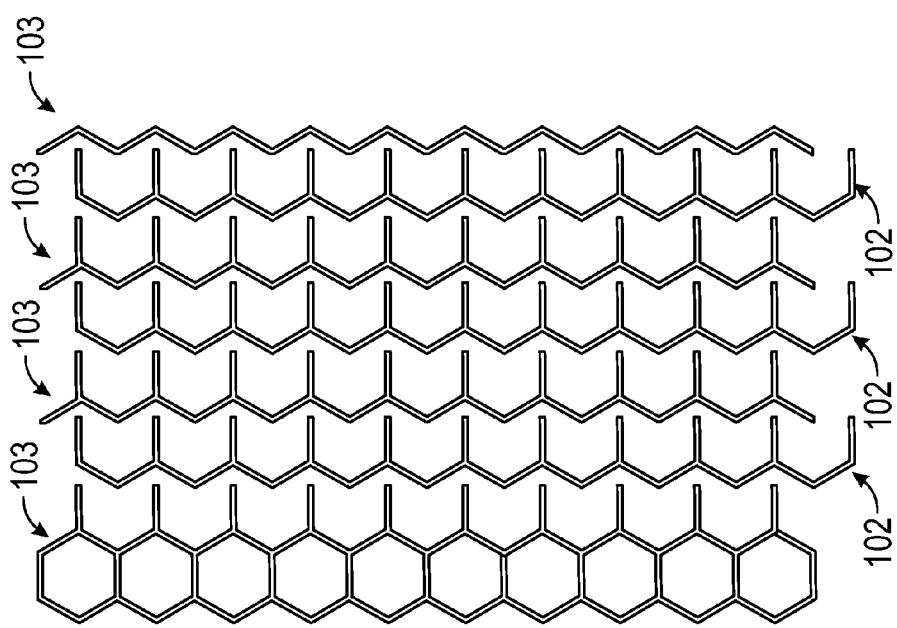

FIG. 4. Illustrates a version of the invention where the mouth of the cells remains unbroken when the comb is in the broken position.

FIGS. 5-10. Illustrate variations to the two part honeycomb.

Figure 11:
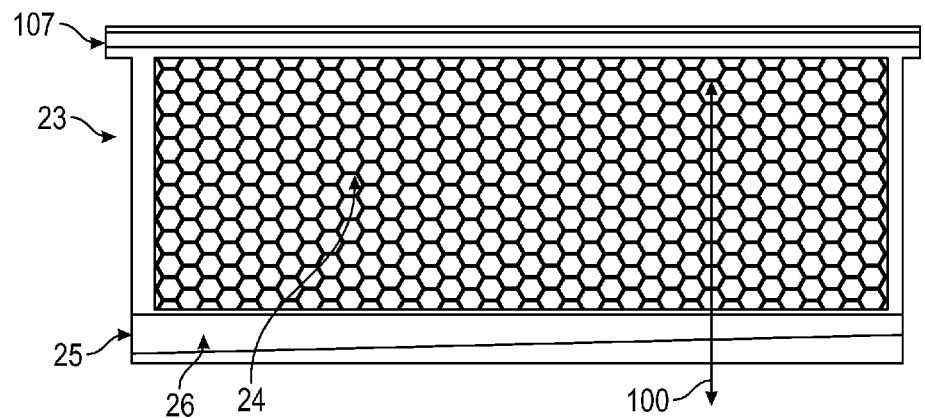

FIG. 11. Illustrates cells in a formed, i.e. closed, configuration

Figure 12:
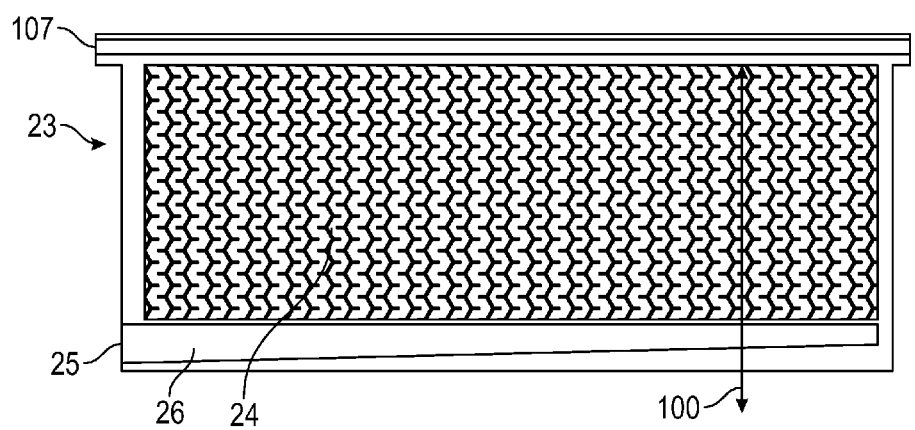

FIG. 12. Illustrates the cells in a broken, i.e. open, configuration.

Figure 13:
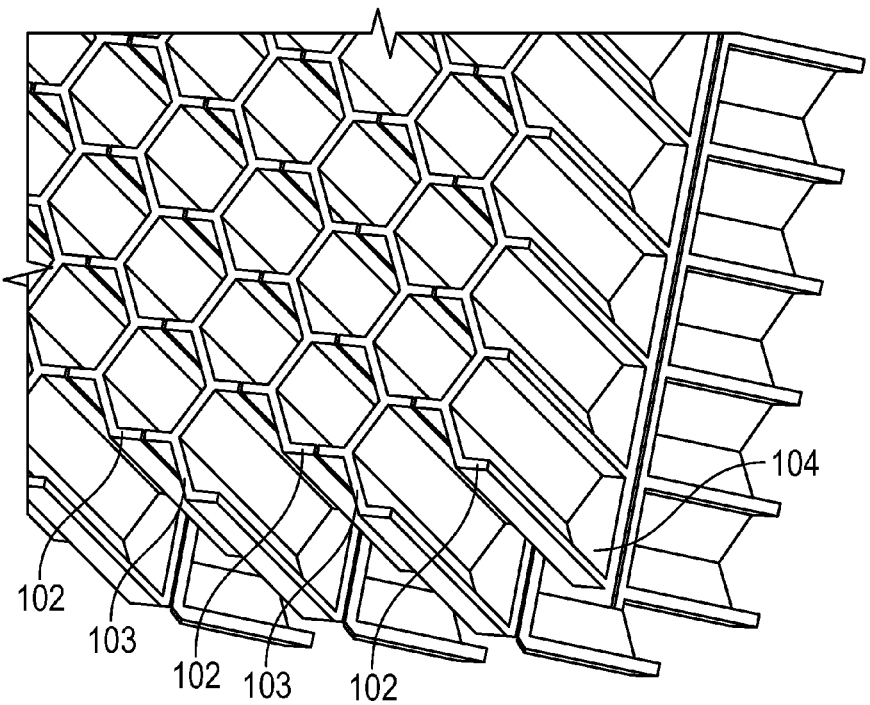
Figure 14:
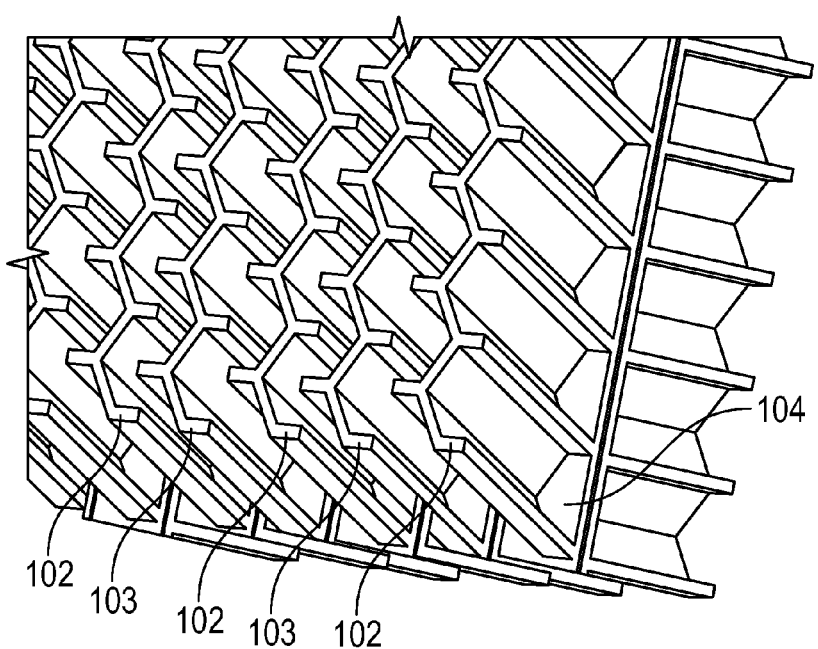

FIGS. 13 and 14. are diagrams of the two part comb in closed and open configurations respectively.

FIGS. 15, 16. Illustrate a portions of a complete honeycomb showing the frame assembly and an actuator in the form of a cam mechanism to operate the frame assembly between the closed (FIG. 15) and open (FIG. 16) positions respectively.

FIG. 17. Illustrates the complete honeycomb for insertion into a hive of which FIGS. 15 and 16 are detail views.

Figure 17A:
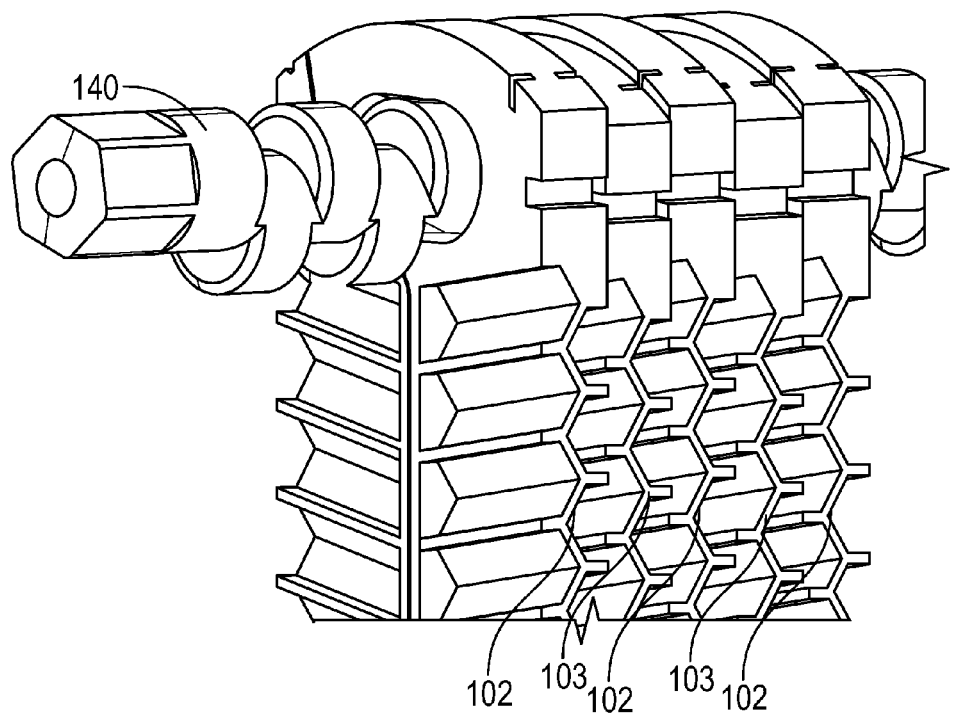

FIG. 17A Is a detailed view of the cam mechanism of FIGS. 15 to 16.

Figure 17B:
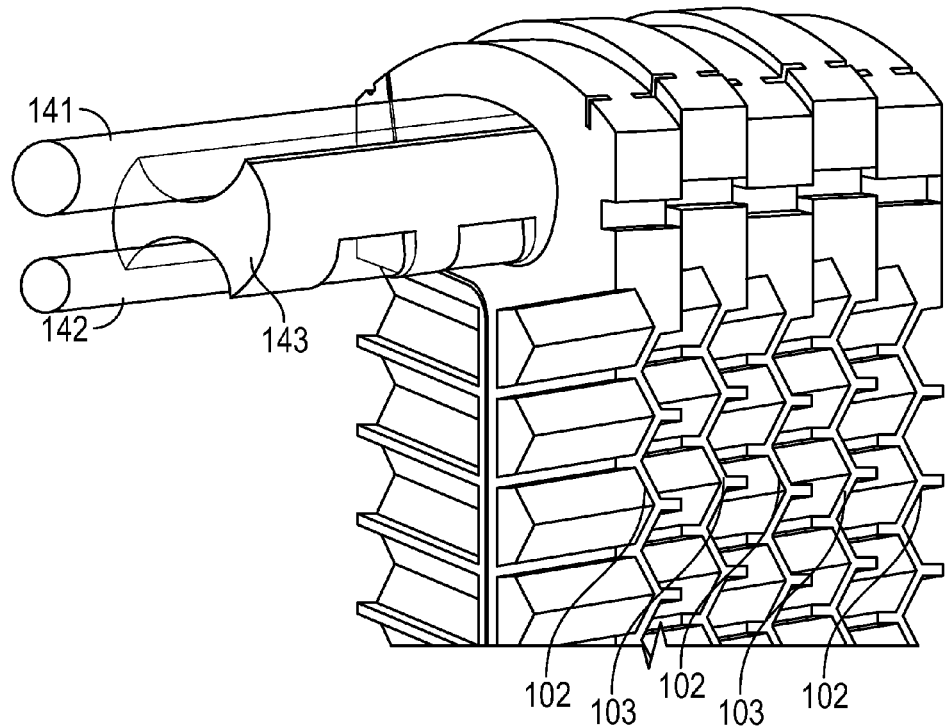

FIG. 17B Is a detailed view of an alternative actuator being a pneumatically operated alternative to the cam mechanism shown in FIG. 17A.

Second Aspect

Figure 18:
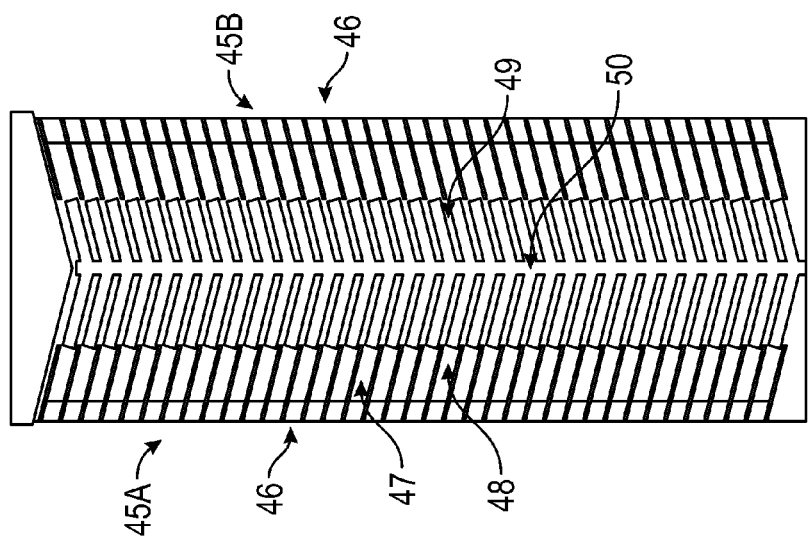

FIG. 18. Illustrates a second aspect of the invention comprising a honeycomb assembly where honey can be ejected by a piston and where the assembly is in the closed "filling" position.

Figure 19:
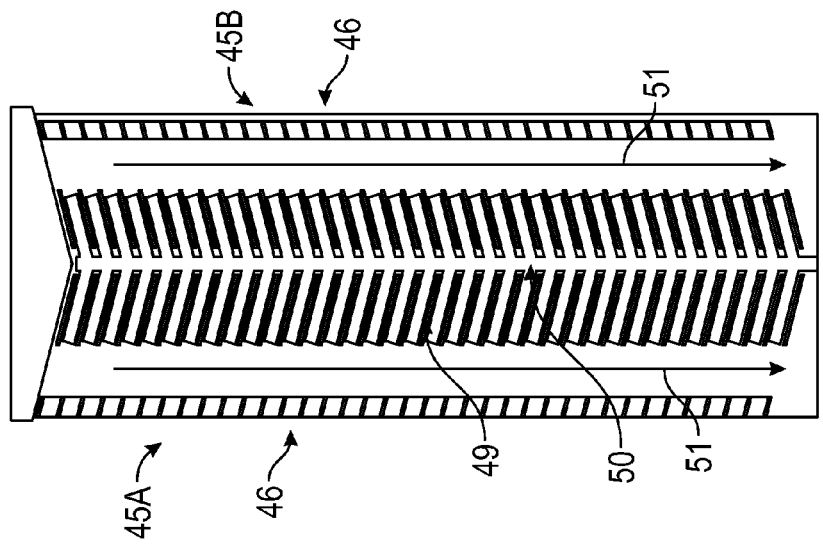
FIGS. 18-19 generally illustrate a second aspect of the invention (the piston version).

FIG. 19. Illustrates the assembly of FIG. 18 in the open "honey extracting" position.

Third Aspect

FIGS. 20-22. Illustrate a third aspect of the invention comprising a honeycomb having one end closed by a short piston or "plug".

Figure 23:
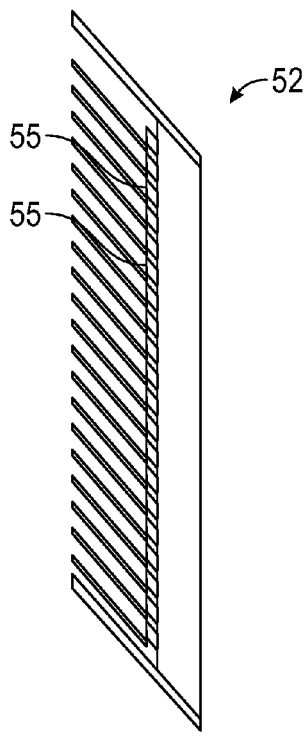

FIG. 23. Illustrates a steeper cell angle to the honeycomb.

Fourth Aspect

Figure 24:
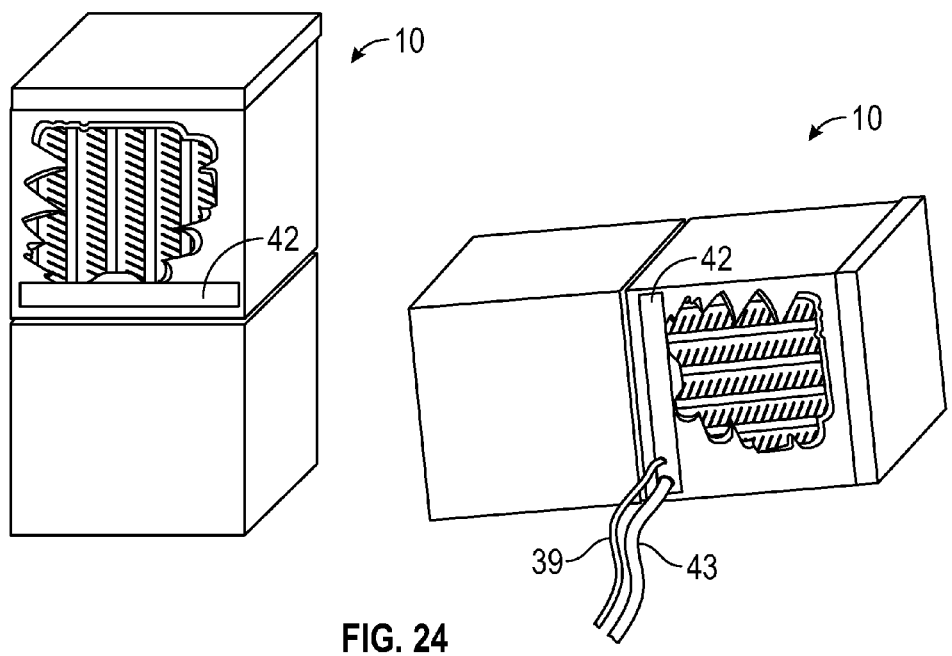
FIGS. 24-25 generally illustrate a fourth aspect of the invention (the split back or tilt version)
Figure 25A:
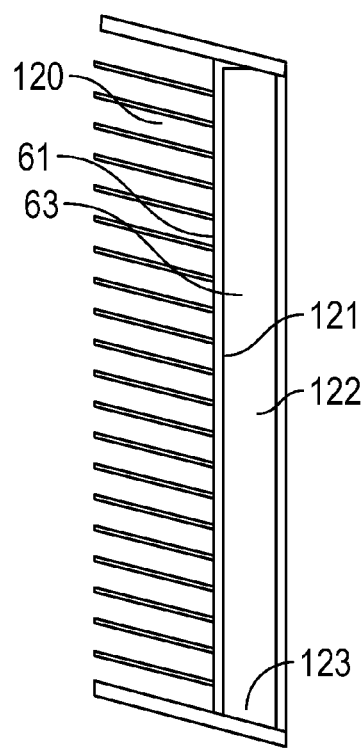

FIGS. 24-25. illustrate a fourth aspect of the invention where the honeycombs can be tilted or positioned in a substantially vertical position to facilitate draining of honey from the honeycombs.

Fifth Aspect

FIG. 26. illustrates the comb filled with honey and capped.

FIG. 27. illustrates the spikes pushed into the cells to break the wax bottom and capping.

FIG. 28. illustrates the spikes pulled out of the cells allowing honey to flow down through the spikes to the honey drain.

Sixth Aspect

Figure 29:
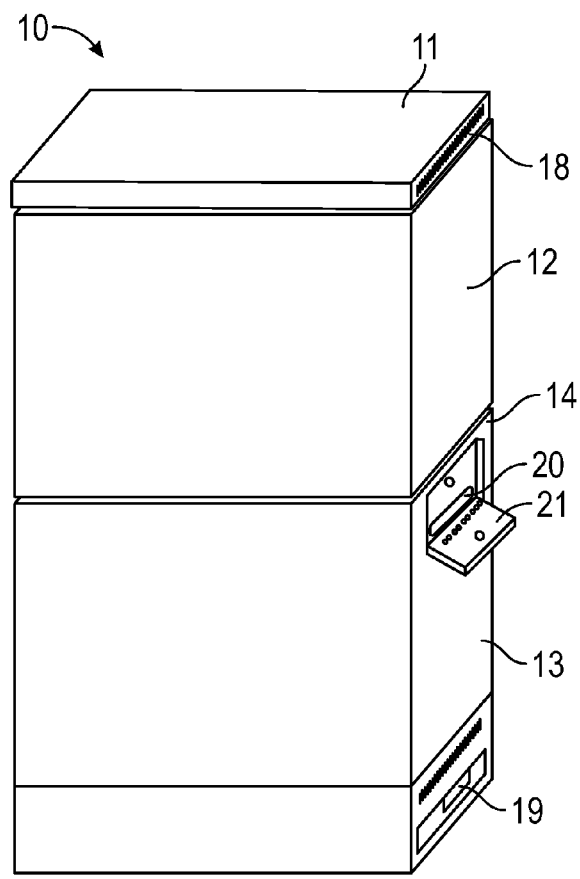

FIG. 29. Illustrates a beehive according to an embodiment of the invention.

Figure 30:
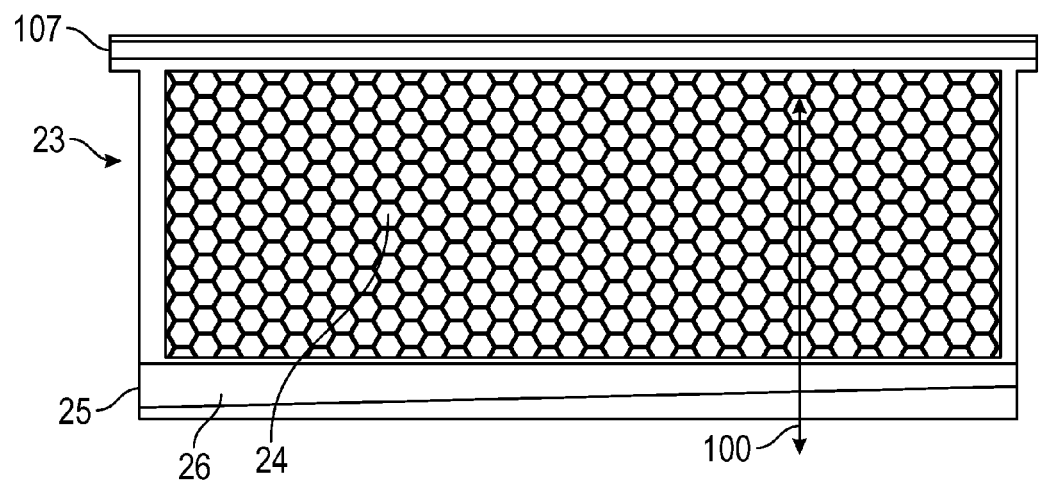

FIG. 30. Illustrates a side view of a honey frame containing an artificial honeycomb FIG. 31. Illustrates a close-up view of a second part of the honeycomb.

Figure 32:
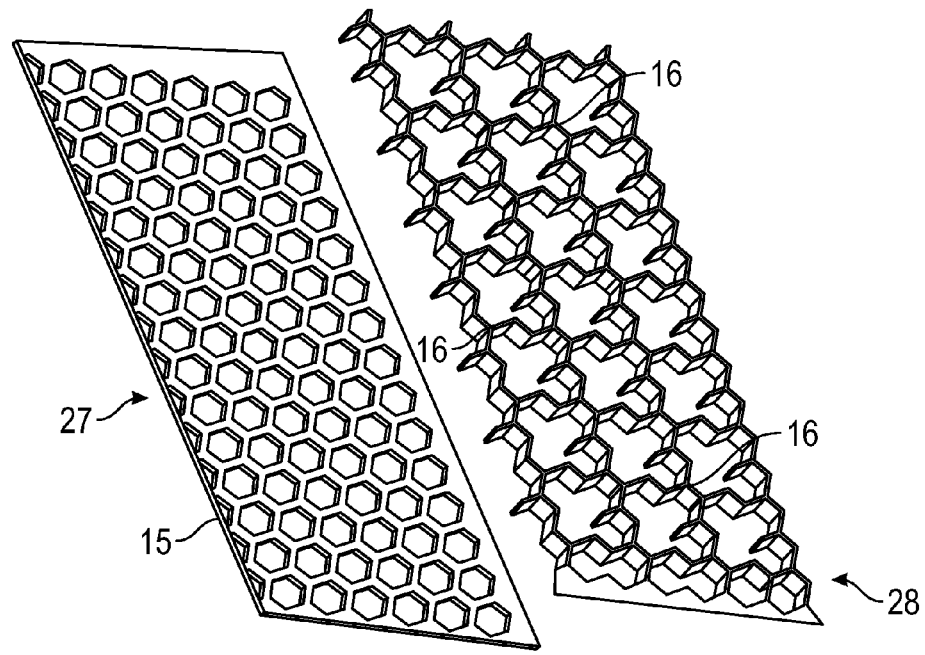

FIG. 32. Illustrates a close-up view of the first part and the second part of the honeycomb.

Figures 33, 34:
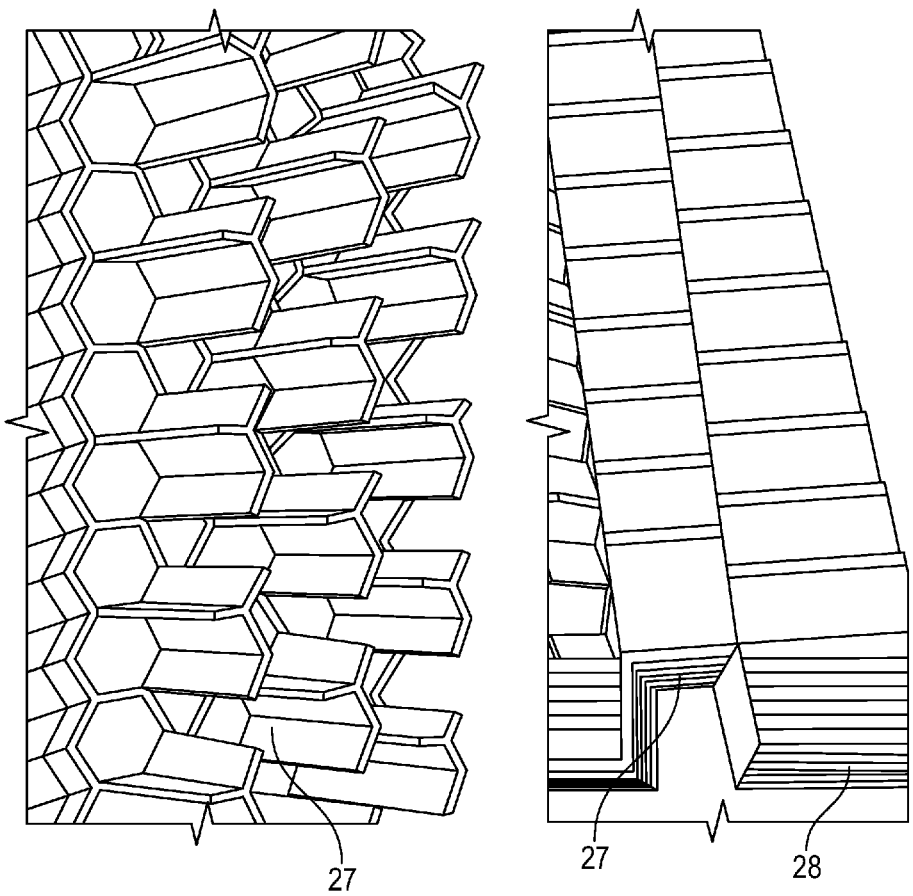

FIG. 33. Illustrates a close-up view of the first part of the honeycomb.

FIG. 34. Illustrates a close-up view of the first part and the second part of the honeycomb in the "cell broken" position enabling honey to drain from the honeycomb.

FIG. 35. Illustrates schematically a honeycomb assembly according to the sixth aspect, of the invention and comprising a pair of honeycombs each with a first part and a second part and where the first part and the second part are in the closed "cell formed" position.

FIG. 36. Illustrates schematically the honeycomb assembly of FIG. 35 with the first part and the second part in the open "cell broken" position to enable honey to drain from the combs.

FIG. 37. Illustrates the edge wall of the honeycomb assembly and particularly illustrating the lowermost honey drain openings and the lower ports through which vacuum can be applied and through which warm or hot air can pass.

Figure 38:
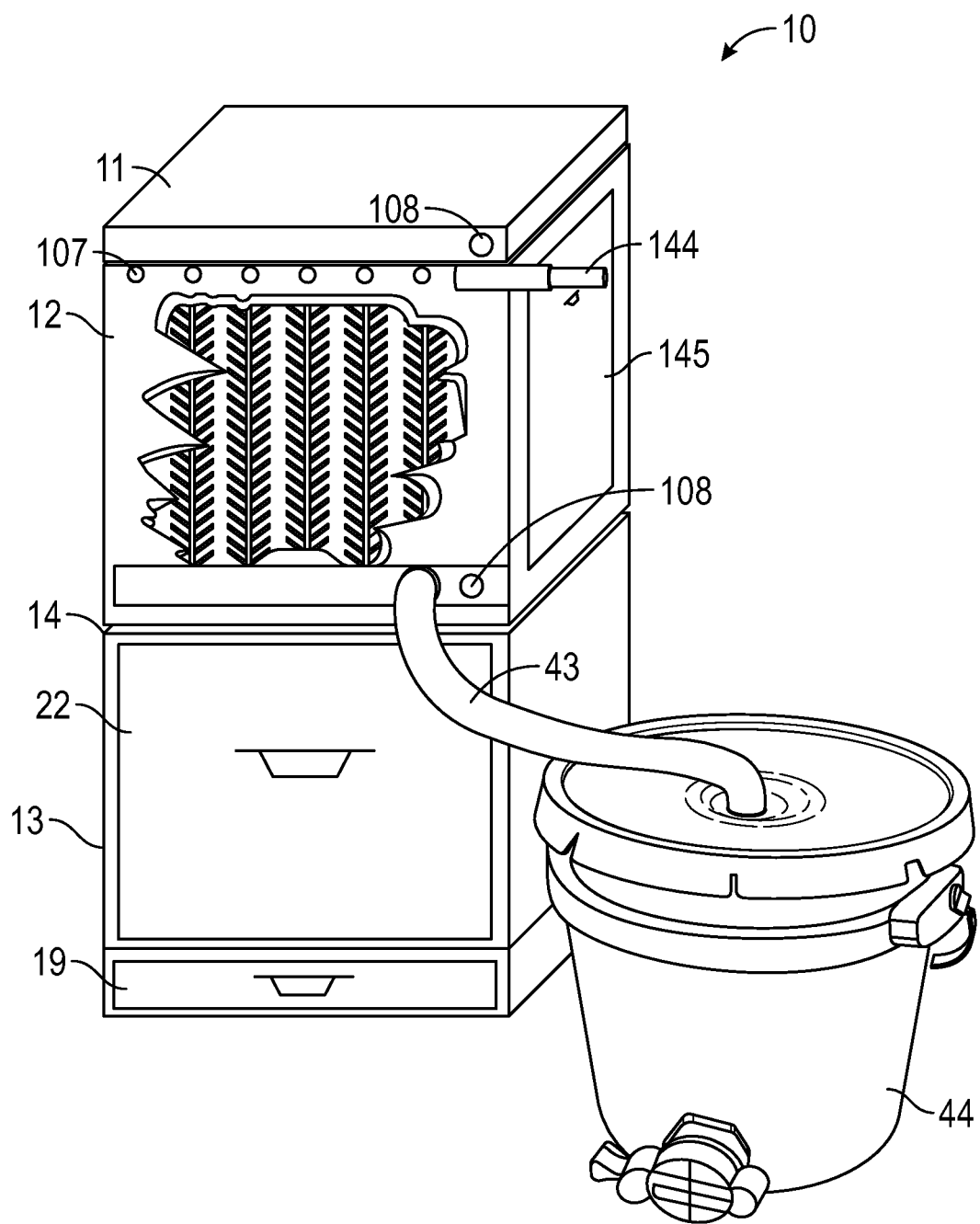

FIG. 38. Illustrates a beehive with a honey drain hose connected to a collection bucket and a honey drain operation handle extending from the beehive.

Figure 39:
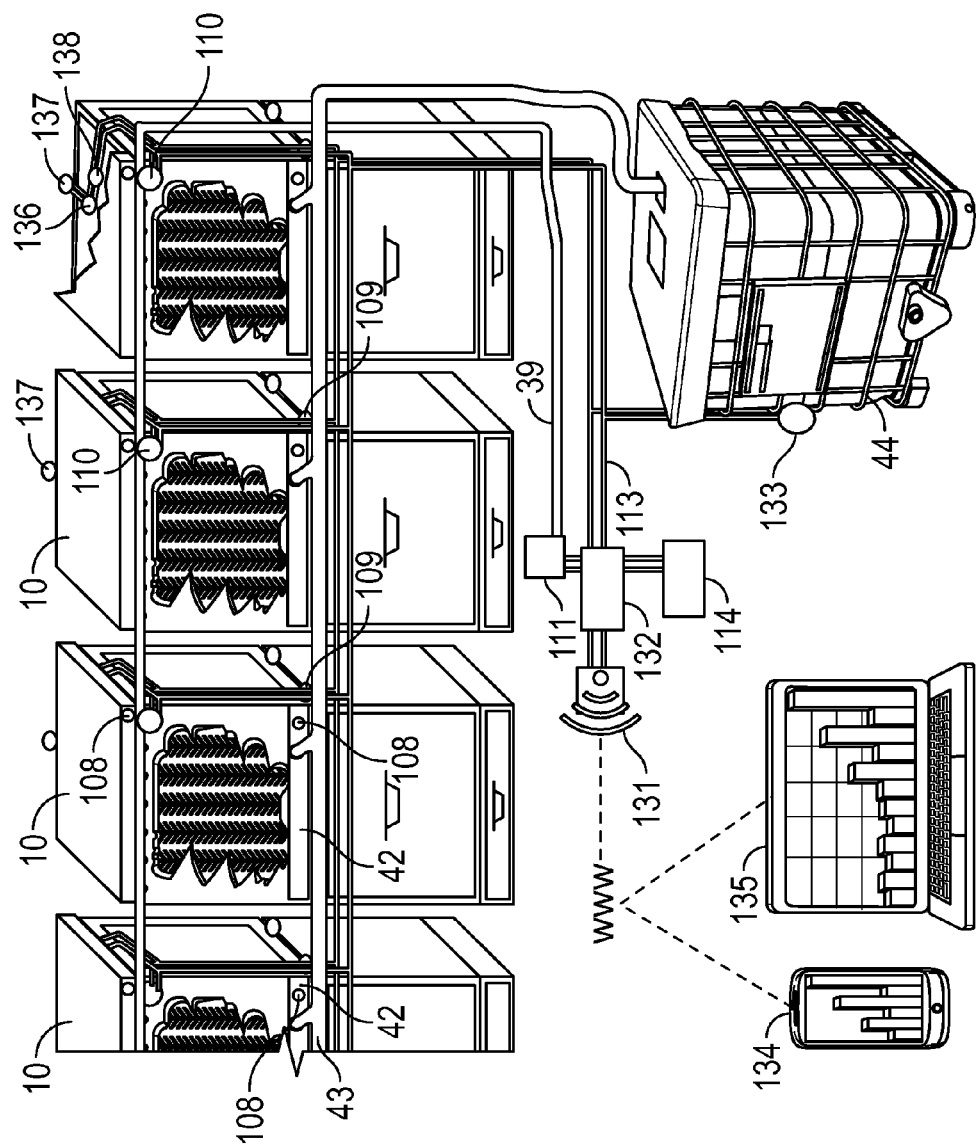

FIG. 39. Illustrates a plurality of beehives connected centrally with a control circuit that allows honey to be automatically extracted from the hives to a common honey container and including a data connection to a data network, e.g. the Internet for remote monitoring and control.

Figure 40:
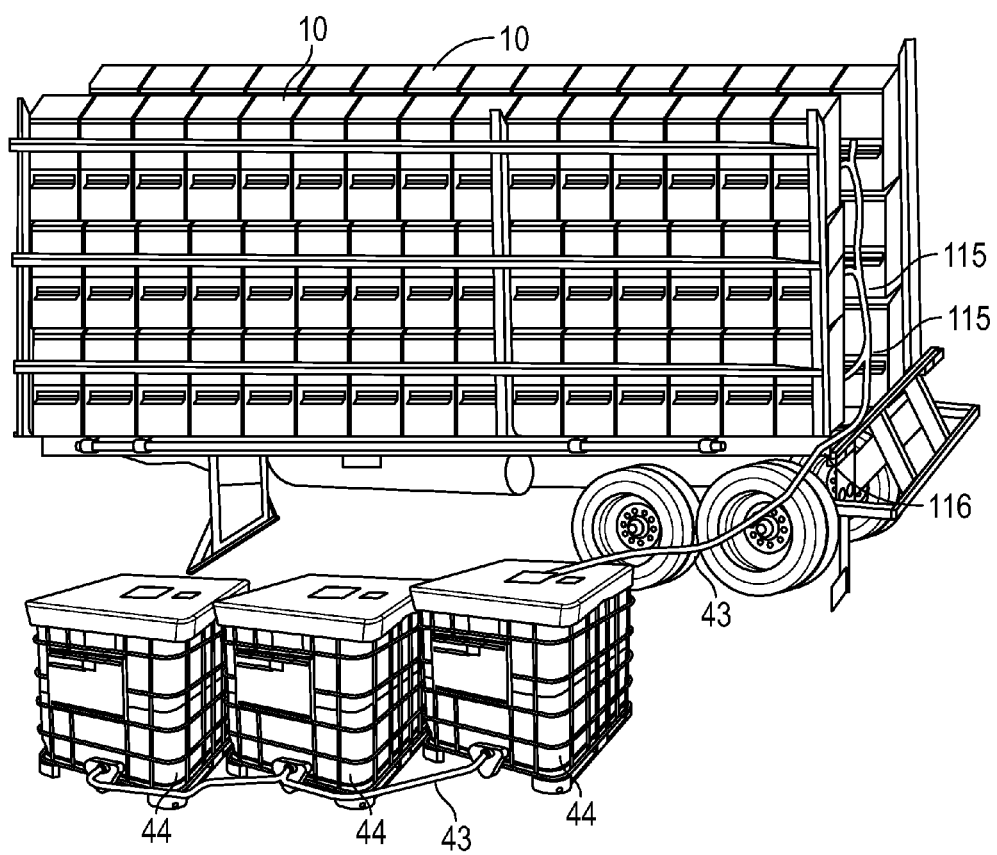

FIG. 40. Illustrates schematically how a multiplicity of hives can be permanently mounted on a trailer and, when desired, the honey can be drained from all, or some of the hives and into one or more honey tanks.

Figure 41:
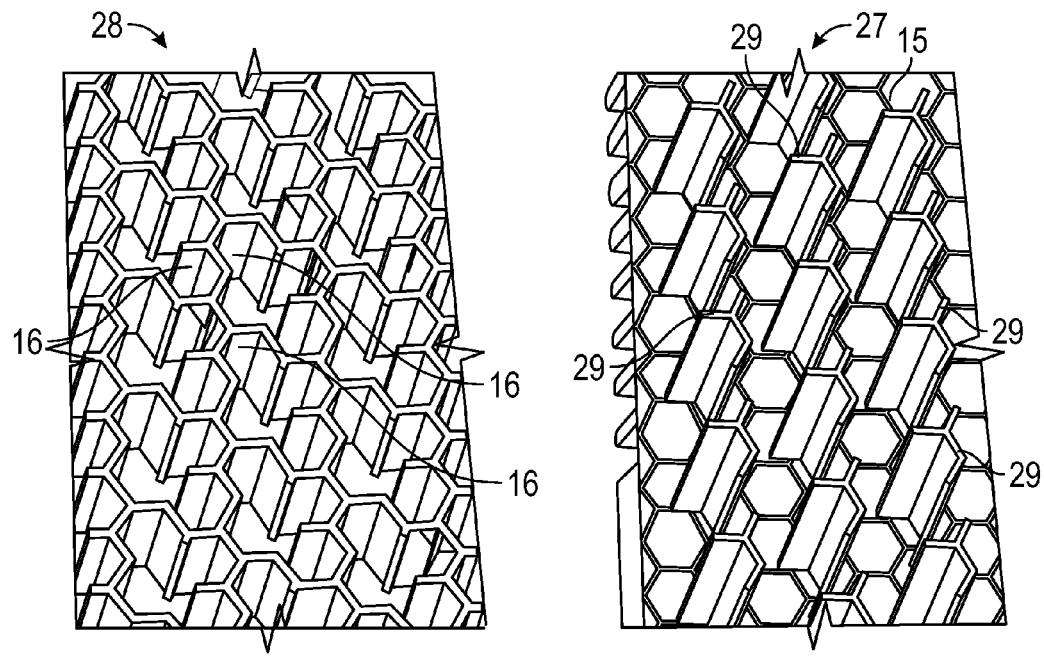

FIG. 41. Illustrates a close-up view of part of a honeycomb of the sixth aspect of the invention and particularly illustrating the second part (on the left) and the first part (on the right), with each part containing part of the cell wall of the honeycomb.

Figure 42:
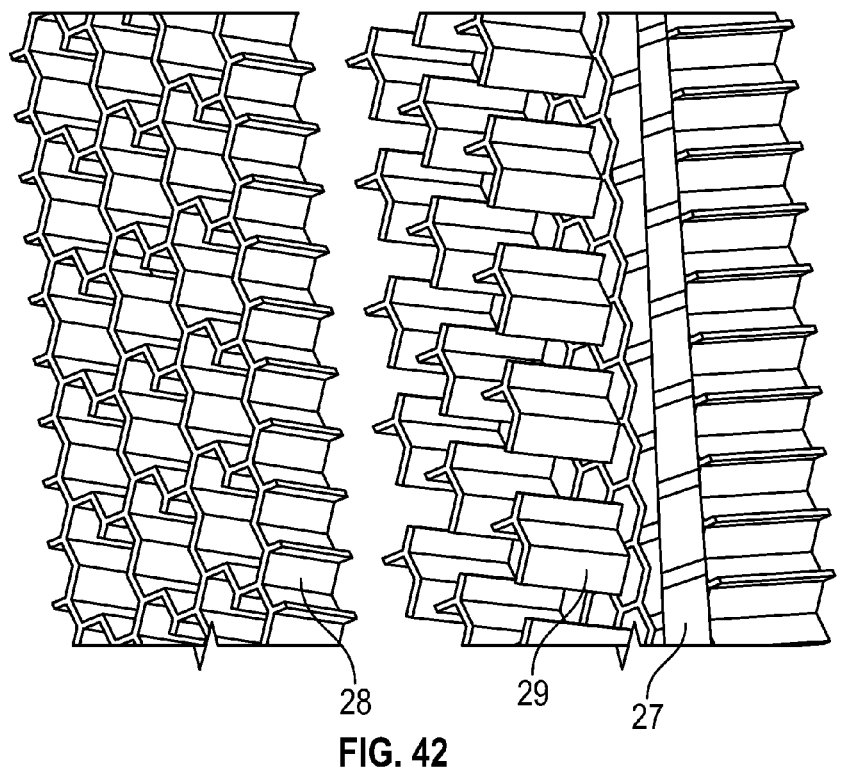

FIG. 42. Illustrates a side view of the honeycomb of FIG. 41 and illustrating the second part (on the left) and the first part (on the right).

Figure 43:
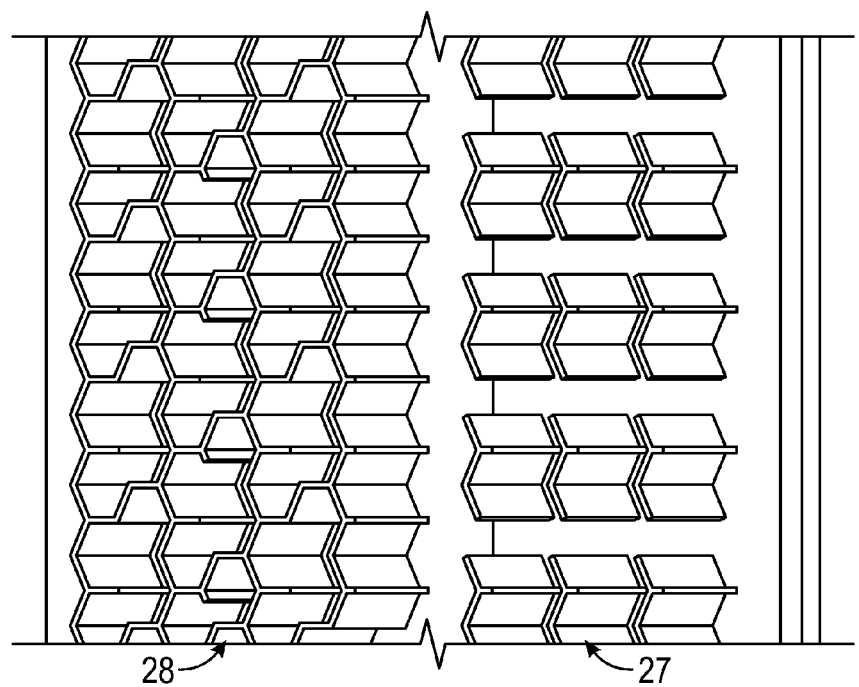

FIG. 43. Illustrates a close-up of the honeycomb of FIG. 41 and FIG. 42.

Figure 44:
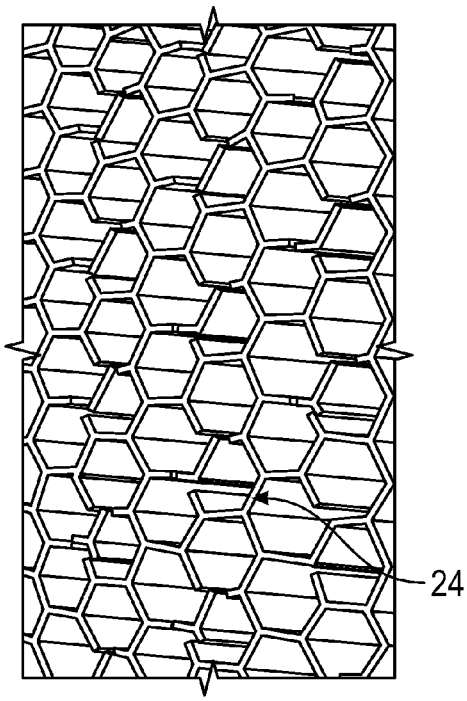

FIG. 44. Illustrates part of the honeycomb of the sixth aspect of the invention where the first part and a second part have been bought together to form the complete hexagonal cell.

Figure 45:
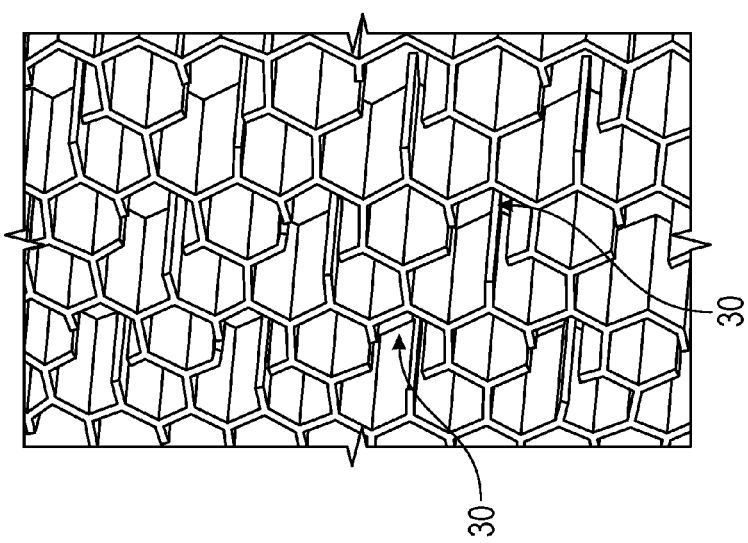

FIG. 45. Illustrates the honeycomb of FIG. 8 where the second part has been pulled back from the first part such that the cells have been broken into much larger parts to enable honey to drain from the honeycomb.

Figure 46:
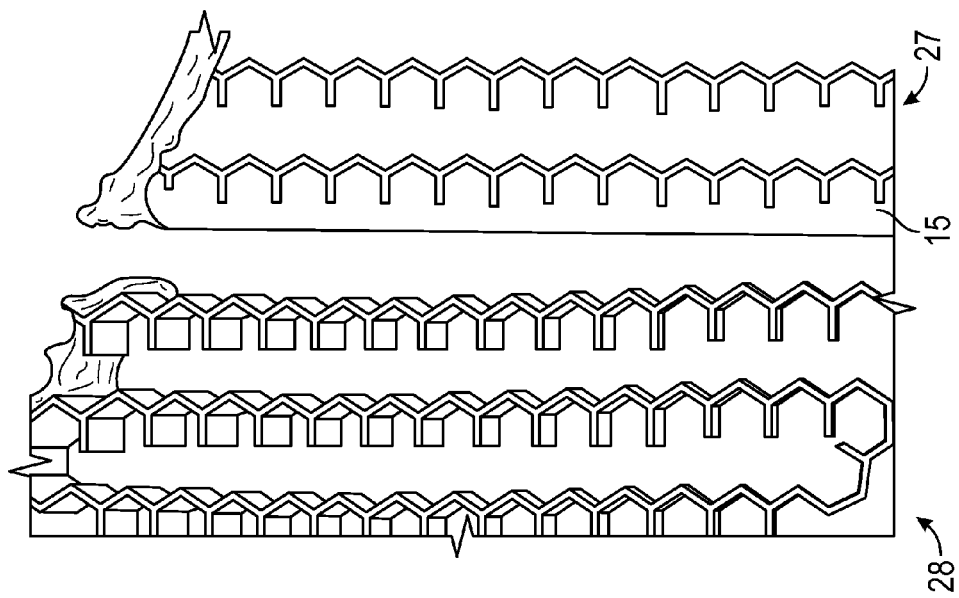

FIG. 46. Illustrates a variation to the first part and the second part of the honeycomb assembly.

DETAILED DESCRIPTION OF PREFERRED EMBODIMENTS

Throughout the following description the cell side wall will typically be hexagonal, which is the typical shape of a honeycomb cell. There may be circumstances where it may be desirable for the cell to have a different shape for instance an octagonal shape, oval shape, round shape, and the like. However the invention may be carried out with the cell having a hexagonal shape and this will be referred to throughout the specification for purposes of explanation.

Referring to FIGS. 1-12 there is illustrated various versions of a first aspect of the invention where the honeycomb is formed of at least two parts, each part comprising part of a cell wall, the parts being slideable relative to each other between a cell broken position and a cell formed position. This aspect of the invention may be termed the "vertical separation method".

As the honeycombs are typically positioned in a vertical manner in the hive, the sliding movement can be a vertical (or up and down movement), an example of which is illustrated by arrow 100 in FIGS. 11 and 12.

Suitably, the honeycomb cells are comprised of two strip like parts as opposed to three or more parts. Each part suitably comprises half of the sidewall of the cells. Each part has half the rear wall i.e. the rear wall of the cell is split down the center (see for example FIGS. 13 and 14).

Thus, the honeycomb comprises a first strip like part 102 and a second strip like part 103, this being best illustrated in FIGS. 13 and 14. Each part 102, 103 contains part of the cell side wall, and contains half the backing plate or rear 104 of each cell. The cells are cut right through so each rear wall of the cell is cut in half. That is, strips of 102 and 103 are identical to each other in FIG. 2 and FIG. 3. In FIG. 4 every second strip is joined by a front section.

The honeycomb of FIG. 1 can be drained by sliding part 102 relative to part 103 so that the honeycomb adopts the configuration of FIG. 2. The cell side walls have now been separated or "broken" to form a channel for honey to flow down so that the honey can drain down into the honey trough 26 (see FIG. 12).

FIG. 3 also illustrates the open position on two rows of cells.

There may be circumstances where it is desirable to leave the front (mouth) of the cell unbroken when sliding the comb parts to break the cells apart. This allows the comb to be drained while keeping the wax cap intact. When the comb is drained and the parts are moved back to the cell formed position, the bees can remove the wax to refill the cell with honey. FIG. 4 illustrates an example of a two part honeycomb where part 103 comprises the entire hexagonal edge 106 of the mouth of each cell. Otherwise, however, part 103 is similar to that described with reference to FIGS. 1 and 2 so that when the two parts are slid apart, the side wall of the cells is opened up to allow honey to drain (see FIG. 4), but the mouth stays intact (see FIG. 4).

FIGS. 5, 6, and 8-10 illustrate variations to the two part honeycomb and especially to the split design.

Figure 7:
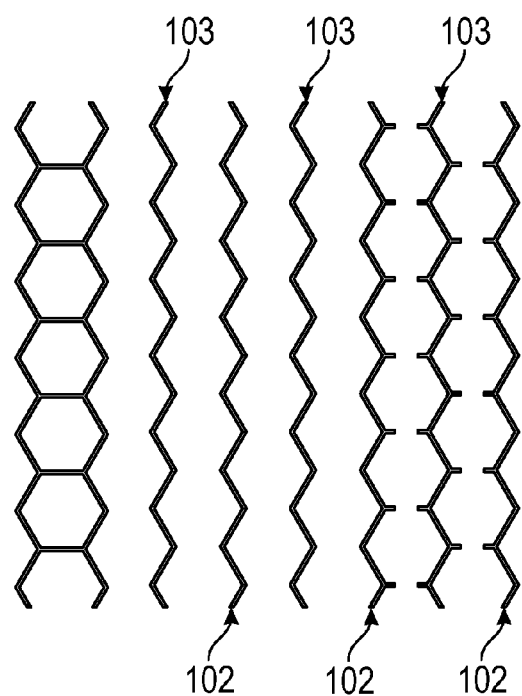
Figure 8:
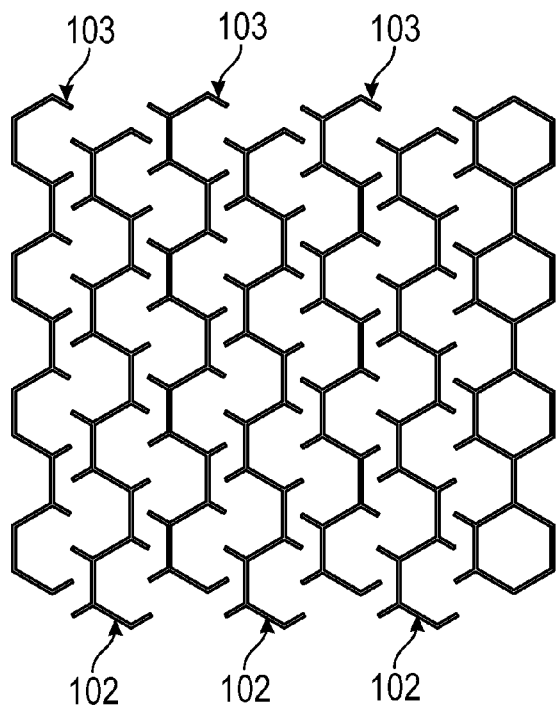
Figure 9:
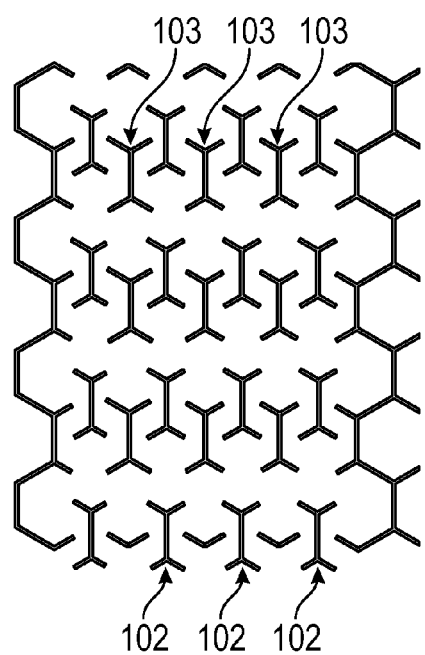
Figure 10:
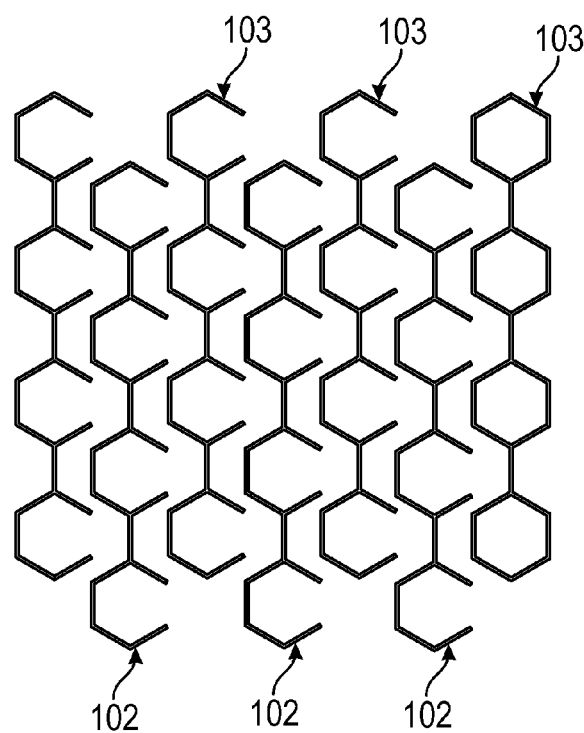

There may be circumstances where it is desirable for the cell wall to be partially incomplete so that the bees can complete the cell structure with wax. The precise wall or walls which are incomplete may vary, but suitably comprise part of the side wall of the cell. FIG. 7 illustrates a non-limiting example of an incomplete cell wall structure where the first part 102 and the second part 103, when in the "closed" position, only define part of the cell wall and the bees will complete the hexagonal cell wall. When the parts are slid apart, the wax walls made by the bees will be broken and the honey can drain. When the parts are moved back to the closed "honey filling" position, the bees will rebuild the missing walls to fully form the cells.

As previously explained, the sliding movement may be performed by any suitable means including by manual means, mechanical means, electrical means, pneumatic means, magnetic means and the like and thus the movement may employ cogs, levers, cam, worm gear, motors, magnetics etc.

The sliding movement can be used to open the cells to enable honey to be drained, but repeated sliding movement between the cell broken and cell formed position can also create a pumping action to assist in removal of the honey from the comb.

To assist honey removal from the comb, heat may be applied. In one form heating elements may comprise, or be imbedded into, part of the cell sidewall to warm the honey. Heating could also be achieved by passing hot fluid or air through channels in the comb.

These elements can double as reinforcing. Heating the comb will also make the comb too hot for the bees to be inside the cells, which has the benefit of getting them out of the way for the parts to move.

When bees decide to start filling each cell they add a rounded lip to the mouth of the cell. This could be moulded into the design to prevent the bees from building out the comb any further, which may make efficient operation of the comb more difficult.

FIGS. 11-12 are two non-limiting examples showing how the vertical separating comb could be used in a honey comb frame. FIG. 11 shows cells formed, while FIG. 12 shows cells broken to form channels for the honey to flow down to the honey trough 26 and out a drain point. The figures also show a system to separate the vertical strips of comb. The comb size, in the illustrations, is exaggerated.

FIGS. 15 and 16 illustrate portions of a frame assembly. The assembly has a cam mechanism 107 which is operated to slide the two comb parts 102, 103 between the closed position FIG. 15 and the open position shown in FIG. 16. A lower draining trough 26 with outlet 25 is also provided. The overall assembly is shown in FIG. 17.

FIG. 17A is a detailed view of cam mechanism 107. It will be observed that the cam mechanism 107 includes a rotatable cam rod 140 that extends through apertures formed in uppermost portions of the parts 102 and 103. The cam rod 140 is formed with eccentric cams that abut comb parts 102 and 103. Consequently, rotation of the cam rod 140 causes the parts 102 and 103 to move from a cell closed to a cell open position and back again as desired.

FIG. 17B depicts a further embodiment of an, actuator to perform the function of cam mechanism 107. In this embodiment flexible pneumatic tubes 141 and 142 each having a closed end are separated by a rigid cradle 143. The tubes 141, 142 and the cradle 143 extend through apertures formed in uppermost portions of the parts 102 and 103. Consequently, as the tube 141 is pressurised it expands putting a force between the parts 143 and the upper part of 102 and 103. Part 143 is shaped in such a way that part 102 cannot move relative to 143 however 103 can move upward into the slots in the lower part of 143. Thus part 103 moves upwards relative to 102 and 143. Another flexible pneumatic tube 142 can be pressurised to return the parts to their original position. Thus by pressurising 141 or 142, at different stages, the array of parts 102 and 103 can be moved between the cell open position and cell closed position illustrated in at least FIG. 13 and FIG. 14 respectively. The visible part of tubes 141 and 142 must be housed in a non-expandable sheath to limit expansion to direct sufficient expansion force to the parts described above.

FIGS. 18-19 illustrates a second aspect of the invention again comprising a honeycomb assembly formed from two honeycombs and where each honeycomb is made from parts which can separate and come together to form the cells and to open the cells to enable honey to be drained therefrom. This aspect of the invention differs from the sixth aspect of the invention in that instead of the side wall being broken or opened up, honey can be pumped out of the front of each cell by a piston type action.

In the second aspect of the invention there is provided a honeycomb 45 (FIGS. 18 and 19 show a pair of honeycombs 45A, 45B), each honeycomb comprises the usual array of generally hexagonal cells but each cell is formed from three parts comprising a front section 46 which can comprise about 10% to 25% of the entire cell length, a separate main body section 47 which comprises a substantially the rest of the cell length, and a rear wall 48. FIGS. 18 and 19 illustrates a section view of the honeycomb assembly comprising the pair of honeycombs 45A, 45B and show an example where each honeycomb has about 30 cells (it being appreciated that the honeycomb will have many hundreds of such cells).

The front section 46 of each cell is open to enable bees to fill the cell with honey and then to cap the cell with wax in the usual manner.

The main body section 47 can reciprocate between a connected position (illustrated in FIG. 18) where the main body section and the front section come together to form a substantially complete cell, and a disconnected position (illustrated in FIG. 19) where the main body section has been retracted away from the front section. In the particular embodiment, the front section of each cell is fixed in position and does not move and the only moving part is the main body section 47 which reciprocates.

The third part of each cell is the rear wall 48 which is the top of a long piston 49. Thus, each cell has its own piston. The piston is fixed and the main body section 47, when it retracts from the front section, slides along piston 49 which causes the contents of the main body section (the honey) to be pumped out the front of each main body section. As each cell will typically be hexagonal, the piston will also have a hexagonal cross-section.

The reason why the main body section is retracted from the front section is to enable honey to be pumped out of the main body section and to bypass the wax cap which the bees place on the front section of each cell. Therefore, rather than needing to remove the wax cap from each cell, in this particular embodiment, the front section containing the wax cap remains in place and the main body section is retracted from the front section to enable honey to be pumped out of the main body section of each cell.

The pistons 49 can all be fixed to a backing plate 50. When the honey has been drained, the assembly can be returned to the "filling" position illustrated in FIG. 18 which now results in the original wax cap still being present on the front section 46 of each cell but the main body section is now empty. The bees notice that the cells are empty and will uncap each cell and then refill and recap. The honey collection process can then be repeated.

The main body section can be reciprocated by any suitable mechanical action. Vacuum may be applied to the assembly to facilitate removal of honey.

When the main body section has been retracted over its associated piston 49 the assembly adopts the position illustrated in FIG. 19 and honey can flow down the substantially vertical open area 51 vacated by retraction of the main body section. A lower end of the assembly can contain the usual honey trough, openings and the like to enable honey to be removed from each assembly. Similarly, openings may be provided to enable warm or hot air to be circulated through the assembly in a manner described above with reference to the sixth aspect of the invention.

A vacuum can be applied to the honey manifold to increase the flow rate. In the case of candied honey in the frame heat can be applied to the honey via the pistons. This can be done electrically or via a heat exchange using a fluid or air circulating inside the pistons.

A third aspect of the invention is illustrated with reference to FIGS. 20-23. This aspect again allows honey to be removed from a hive without removing the honeycomb frames. This aspect again has the honeycomb formed from different parts that can be opened and closed to enable bees to fill the cells with honey and to enable the honey to be drained. Referring to FIGS. 20-23 there is illustrated a honeycomb 52 comprising cells 53 having an open front 54. The rear end of each cell is closed by a short piston or plug 55. The pistons associated with the cells are mounted to a common connecting member in the form of a back plate 56. Back plate 56 can be retracted from the position illustrated in FIG. 20 (and FIG. 21) to the position illustrated in FIG. 22. In this retracted position (FIG. 22), the back of each cell has now been unplugged and honey can flow through the back of each cell to a lower collection point. The back plate 56 can be moved mechanically or by some other means between the closed position illustrated in FIG. 31 where the cells are closed and the retracted open position illustrated in FIG. 22.

The honeycomb is constructed in such a manner to provide a pathway for the honey to enable the honey to flow under the influence of gravity to a collection area. In one form, this can be achieved by inclining each cell to facilitate the flow of honey from the cells when the cells have been opened.

FIG. 23 illustrates generally the honeycomb described above but with a steeper cell angle.

This aspect of the invention can be used with the "tilted hive" aspect of the invention which will be described below.

Figure 25B:
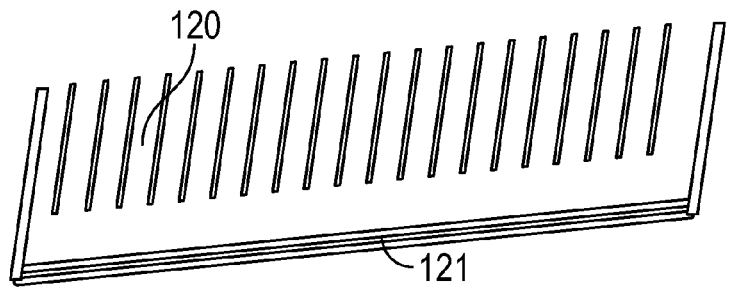

An embodiment according to a fourth aspect of the invention, will now be described with reference to FIGS. 24 and 25A-25C, This embodiment is comprised of a one sided plastic honey comb assembly 120 and a back plate 121 that breaks away to allow honey to flow rearward and out through a manifold once the whole hive is tilted almost on its side as shown in FIG. 25B.

Figure 25C:
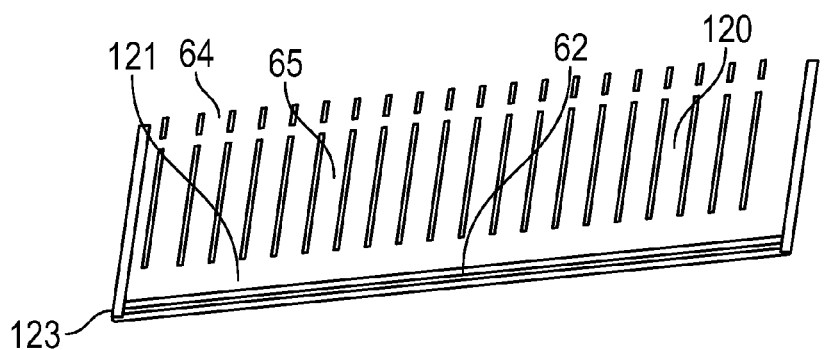

The backplate 121 may be heated to improve flow of the honey. Heat can be applied electrically or by heat exchange in the diaphragm cavity. Depending on the bees reaction to tilted frames the frames may be tilted permanently. The back plate may be moved by applying a vacuum line 39 (as shown in FIG. 24) to depressurize one side of diaphragm 123 to thereby cause it to move inward. Conversely, the back plate can be returned from the retracted open position to the forward closed position by applying pressurised air into the cavity 63. Alternatively other mechanical means, such as a rotatable cam or a pneumatic or electrical actuator may also be employed. The honey can be extracted often so that the bees do not build capping. However, in that case the honey may require drying to decrease water content of the final product. Alternatively, the comb 120 may be divided as shown in FIG. 25C to separate the front section 64 from the rear section 65 so that the capping, which occurs on front section 64, is separated from the main body of comb 120.

This aspect of the invention may also be used with the honeycomb having the short pistons described previously.

In order to break the capping the short pistons may move toward or away from the comb, this causes the honey to move thus rupturing the capping. Then the back plate and pistons can move away from the comb providing a path for the honey to drain.

Referring to FIGS. 26-28, there is described a fifth aspect of the invention which can be referred to as the "Spike Method". FIG. 26 illustrates the comb filled with honey and capped. FIG. 27 illustrates the spikes pushed into the cells to break the wax bottom and capping. FIG. 27 illustrates the spikes pulled out of the cells allowing honey to flow down through the spikes to the honey drain.

This method can use a back plate 121 that has an array of spikes 128, one for each honey cell of plastic honey comb 120. The bees wax the rear of the cell 127, fill with honey and cap the cell 126. To extract, the back plate and spikes move into the cells thereby breaking the wax bottom and the cap. The back plate and spikes then pull back allowing the honey to flow down through the spikes 128 and out a honey drain hole 129 and into a manifold like in previous methods. This spike method could also be used on the tilt style hive with one sided honeycombs. The back plate and spikes can be moved with a diaphragm 123 or other mechanical methods detailed previously.

FIGS. 29-46 will be referred to explain an embodiment according to another aspect of the invention which can be identified as the sixth aspect of the present invention.

Referring initially, to FIG. 29, there is illustrated a side view of a hive according to an embodiment of the present invention. The hive 10 comprises a top lid 11, an upper honey super 12, a lower brood box 13, a series of load cells 14 monitoring the weight of the honey super, the reasons for which will be described below. Also illustrated in FIG. 29 are thermostatically controlled vents 18, a lower pest trap 19, an entrance to the hive 20 containing a mite brush, and a hinged landing board 21 which can hinged upwardly to close the hive entrance for transport. An inspection opening 22 in the form of a removable panel of the hive is provided to enable the brood frames to be inspected without the need to remove the honey super. Although not illustrated, there will usually be provided a stand on which the hive is supported.

FIG. 30 is a side view of a honey frame containing an artificial honeycomb 23. The honeycomb in the particular embodiment is formed from plastic and comprises generally hexagonal cells 24 with each honeycomb having hundreds of such cells. The lowermost part of the frame contains a honey trough 26 to catch honey, dripping from the upper cells and to drain the honey to the lower rear part 25.

The honeycomb is of a special design that forms part of the sixth aspect, and possibly other aspects of the present invention. Particularly, the honeycomb is made from two parts which, for the sake of convenience, can be called a first part 27 and a second part 28. FIG. 32 illustrates an embodiment of these two parts. The first part and the second part are also illustrated in FIG. 33, FIG. 34, and FIGS. 41-45. A variation of the first part and the second part is illustrated in FIG. 46 and this will be described in greater detail below.

Referring to FIG. 41, the first part comprises various extending wall portions 29 which form part of the hexagonal side wall of each cell of the honeycomb (it being appreciated that the honeycomb may have many hundreds of cells). In particular, the precise configuration of the extending wall portions 29 are such that the portions comprise half of a hexagonal complete cell and therefore comprise either two or three walls of the hexagonal cells. These walls 29 extend from an end wall 15 and are therefore fairly well supported in a robust manner.

Referring to FIG. 41 and also FIG. 32, the second part 27 comprises a pattern of walls which constitute the remaining three walls of a particular hexagonal cell. To provide robustness to the second part, the second part of the embodiment illustrated at least in FIG. 32 and FIG. 41 comprises interconnecting walls 16 which also form part of the hexagonal cell but have an additional function to provide "cross-linking" to the second part 28 to make the second part fairly robust.

Figure 31:
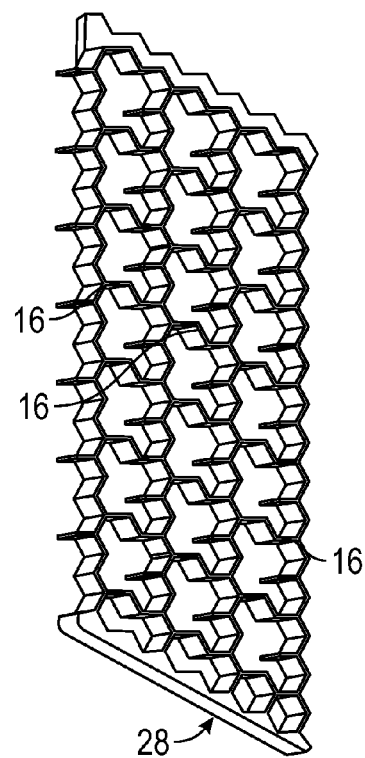

When the first part 27 and the second part 28 are pushed together, they come together to form a complete hexagonal cells this being illustrated at least in FIG. 31 and FIG. 44. These hexagonal cells are now similar to the cells made by bees and when the honeycomb is inserted into the honey super part of the hive, bees will begin to fill the cells with honey. As is normal, once a cell is filled with honey, the bees will cap the open end of each filled cell with a wax cap.

The first part 27 (defining part of a cell wall) and the second part 28 (defining the remainder of the cell wall) are movable between the cell forming position and the cell breaking position where the cell side wall is broken or opened up. This movement is a small reciprocating movement of the first part (which moves) relative to the second part (which does not move). The movement is quite limited and it is expected that the movement need only be between 10-50 mm. FIG. 44 shows the honeycomb in the closed "cell forming" position where the two parts are together to form hexagonal cells. In FIG. 45, the first part has been pulled rearwardly and it can be seen that the cells have now been "broken" or opened up to much larger size 30 to enable honey in the cells to drip downward in a direction lateral to the cells for the depth of the cells, the depth being transverse to the direction of the honey, and into the honey trough 26 (see FIG. 30).

A side view of the "broken or open" position between the first part 27 and the second part 28 is illustrated in FIG. 34. The two parts need not be entirely separated but can be retracted just enough to open up the cells to enable honey to flow to the honey trough.

The honeycomb as described above forms part of an assembly which is illustrated schematically in FIG. 35, FIG. 36 and partially in FIG. 37. The assembly 35 comprises a pair of honeycombs 32, 33 as described above (that is, each honeycomb comprising the first part and a second part). The honeycombs 32, 33 are spaced apart in a side-by-side parallel relationship to form a chamber 34. The chamber will typically have a width of between 30-150 mm. The honeycombs 32, 33 are positioned back-to-back as shown.

The chamber 34 is sealed and airtight with the sidewalls of the chamber comprising the end wall 15 of each of the first parts 27 and the top wall, bottom wall, and the sidewalls comprising sealing strip members 35. Extra gasket seals or similar 36 may be provided. Inside chamber 34 and approximately midway in the chamber is a stopping plate 37 which is perforated to allow air to flow through the stopping plate.

Chamber 34 is associated with ports 38 this being best illustrated in FIG. 37. A pressure/vacuum hose 39 (see FIG. 39) can be attached to one of the ports 38 to enable the air pressure in chamber 34 to be increased or decreased. When the pressure in chamber 34 is decreased (e.g. a vacuum is applied), this will cause the end walls 15 to be move towards each other from the position illustrated in FIG. 35 to the position illustrated in FIG. 36. Thus, applying vacuum into chamber 34 will cause the first part 27 of the honeycomb to be retracted from the second part 28 of the honeycomb. This, in turn, will cause the cells of the honeycomb to be broken up into much larger openings to enable honey to be drained from the cells. As shown in FIG. 38, movement assemblies 107 are provided for separating the two halves of the combs.

An opening 108 is also provided for ingress of hot air to heat the honey super so that the honey flows more easily but without raising the temperature so high as to harm the bees. The use of hot air may be indicated if the honey goes to candy in the hive or is too thick to flow out.

Another important advantage of this arrangement is that retraction will also cause the wax cap on the open front end of each cell to be broken as the side wall of the cell opens up.

Once each honeycomb 32, 33 of the assembly is in the open position illustrated in FIG. 36, honey in each cell can flow generally in the downward direction of arrow 41 lateral to the cells for the depth of the cells, which is transverse to the flow direction, into the honey trough 26 (see particularly FIG. 36), and then flow out of a honey drain opening 40 (see FIG. 37) below each of the honeycombs 32, 33.

A manifold 42 (see FIG. 39) can be fitted over each of the drain openings 40 on each hive, and a hose 43 can be attached to manifold 42 to drain the honey into a collection tank 44 or something similar. When a honey super is full, load cells 109 trigger opening of pneumatic valve 110, which triggers the vacuum/pressure pump 11. That in turn activates the pneumatic movement mechanism at the top of the frame, which moves the comb to the open position. Consequently the honey drains down to the trough at the bottom of each honey frame and out the manifold 42. Honey then travels down a honey pipe 43 and into a collecting container 44. A battery supply 114 supplies power via wires 113 to load cells and pneumatic valves and the vacuum/pressure pump 111.

Tank 44 as shown in FIG. 39 is a commercial scale pallet style honey tank. These can be moved into orchards with a forklift, A honey tanker truck can then come to site and pump out each honey tank 44 or swap the honey tank.

Chamber 34 is a sealed unit and therefore applying vacuum to chamber 34 to suck back the first part 27 towards each other (see FIG. 36) does not create a vacuum in the remainder of the honeycomb. Also, sticky honey does not at any time find its way into the sealed chamber which could cause the smooth operation of the first part to fail. Honey can flow under gravity towards the honey troughs 26. It is typical for a pump to be provided to pump the honey through the outlet 40 of each frame and into the honey tank.

However, it is envisaged that this could also be achieved by gravity for instance if the honey tanks 44 are below the beehives 10 as illustrated in FIG. 40.

To assist in the flow of honey, warm or hot air can be pumped into the assembly. The warm or hot air can be pumped through one of the ports 38. For instance warm air would be circulated for some time prior to a vacuum being applied as the partial vacuum would have less heating capacity. Heat can also be applied to the honey whilst in the comb using a fluid instead of air or electrically using heating elements built into the backing plate. Once the honey has been warmed, vacuum can be applied to open the honeycomb. A pump can be attached to drain openings 42 to assist in removing the honey out of the assembly. Importantly, it can be seen that the hot air remains generally within the assembly and does not contact the bees directly in the honey super or in the brood box.

Once the honey has been drained, chamber 34 can be pressurised to push the first part 27 back into the forward position where the cells reform the hexagonal wall structure and the bees can refill each cell with honey.

The honey super 12 is supported or measured by load cells 14 (indicated in FIG. 14). These load cells measured the increasing weight of the honey super as the cells are filled with honey. A relatively simple calculation can calculate the approximate weight of the honey super once the honeycombs have been filled with honey by the bees. Once this weight is approached, this can trigger an automated opening of the honeycomb parts in the manner described above to cause honey to drain from each assembly. Thus, there is no need to open the hive or to unnecessarily disturb the bees by smoke, removal of the honeycomb frames etc.

Referring again to FIG. 38, the hive 10 is connected via tube 43 to a collection bucket 44. A handle 144 extends from the hive and is internally mechanically coupled to the cam shafts of cam mechanisms 107. Accordingly, by operating the handle the cells of the honeycombs are brought from a cell closed to a cell open position so that honey drains down to an outlet to which tube 43 is connected and thence to the collection bucket 44. In this embodiment of the invention an observation window 145 is also included so that a bee keeper may open the window and look directly into the hive.

Referring again to FIG. 39, electronic load cells 109 are placed under the honey super. It will be realised that they could alternatively be placed under the bases of the hives. The load cells communicate with a control unit 114 via connecting electrical cables 113. When the load cells generate a signal indicating a predetermined threshold weight has been reached the control unit triggers the pneumatic solenoid valve 110 to open and the pressure pump supplies pressure to the pneumatic movement mechanism detailed in FIG. 17B. Consequently the combs in the hive move from a cell closed to a cell open configuration so that honey drains under gravity, or possibly by action of a pump, down the honey line 43 to collection tank 44. The collection tank 44 includes a honey level sensor 133 that communicates with the control unit 132 via a data connection. When the honey level sensor indicates that a desired level has been attained the control unit responds by sending a message wirelessly via the wireless internet adapter 131 via the Internet (or a loca data network) to an operator's computer 135 or mobile device 134. The operator is presented with an alert advising that the honey container is ready for collection.

Video cameras 136 are also fitted in the honey super, the brood nest (not visible) and outside the hive 137. The cameras 136 generate a data stream which can be viewed remotely by the operator on devices 134 and 135 via the Internet and control unit 132. The video images may include images of the comb surface and bee activity in real time.

If heating is required for the honey to drain adequately then a source of heat can be added as described in the various aspects of the invention and programmed as part of the automation Openings 108 are provided on the hive for ingress of warm air via tubes coupled to a heater.

As illustrated in FIG. 29, each beehive has an entrance 20 to the hive containing a mite brush, and a hinged landing board 21 which is hinged upwardly to close the hive entrance for transport. In the embodiment depicted in FIG. 39, each landing board 21 is coupled to an actuator, such as a small electric or pneumatic motor, that is arranged for remote control across a data network. Accordingly an operator, by means of computational devices 134 or 135 is able to remotely open and close the entrance 20. Furthermore, an entrance status sensor may be fitted to each entrance so that the operator can remotely check that the landing board is indeed either open or closed as desired. This feature of being able to remotely open and close the hive confers a number of benefits as follows:

It is possible to remotely close the entrance in the evening in preparation for moving hives at night It is possible to remotely open the hives in the morning after the hives have been moved It is possible to remotely close the hives if disease or pests are detected so as to minimise spread of disease/pests.

May close automatically if disease/pests detected in order to quarantine the hive In addition to the sensors and actuators mentioned above, additional data may be remotely logged by means of further sensors located in the honey super 138 and brood chamber. These sensors may include, for example and without limitation sensors to measure the following parameters, Temperature in various locations inside the hive
Hive humidity
Sound
Vibration
Bee activity level
Weight of brood box and weight of super/s
Beetle, moth, ant and other pest invasions (cameras or other detection devices)
Bee numbers exiting and entering the hive Data from these sensors may be collected and transmitted via the control unit 132 across the Internet to a remote database, for example running on laptop 135 or mobile device 134.

All this information can be sent to a data collection point which may be an apiarist's PC, IPhone or web-box (non-limiting examples). This allows an apiarist to monitor hive health (pests and diseases) and when to harvest honey. This applies whether the bee-keeper has one or thousands of hives.

All of this information could be sent to local, state, federal or international monitoring bodies who can then geographically monitor (non-limiting examples):

Pollen and nectar flows, including types of flower and relationship to weather/climate
Disease spread and containment
Pest spread and containment
Success/failure of hive health and disease prevention strategies
Actual honey production and the possibility of identifying adulterated or contaminated honey The logging and analysis of the collected data from the sensors gives rise to a number of benefits, including the following:

Open up a variety of research possibilities using the huge amount of data
Provide the possibility of rapid response to disease/pest outbreaks
Give immediate information on the relative success of disease control measures
Identify more productive areas giving apiarists the opportunity to use information to move hives quickly
Help stop the adulteration and watering down of honey
Provide the possibility of government legislation to mandate electronic monitoring so as to best ensure the health of a country's bees and honey production.

Collaborating bee-keepers can send the information to a web site so that local/regional bee-keepers can compare the performance and health of their hives with hives in their area. This provides a forum for collaboration and the sharing of information in a region.

FIG. 40 illustrates a truck trailer containing a multiplicity of hives 10. As the hives shouldn't need opening they can be a permanent fixture on a trailer. Access to the brood nest is available from the rear of the hive for easy access when needed. It will be observed that one way valves 115 are provided to prevent honey flooding lower hives. A honey pump 116 is provided to aid flow of honey to honey containers 44.

The honeycomb can remain within the hive while it is moved between the cell forming position and the cell breaking position and therefore allows honey to be drained from the hive without needing to remove each honeycomb from the hive which is the traditional method of honey removal.

FIG. 46 illustrates a variation to the honeycomb structure. FIG. 46 is similar to that described above in that the honeycomb comprises a first part 27 and a second part 28. Each part again comprises half of a complete cell with the first part 27 further containing the closed end wall. In this variation however there are no interconnecting walls 16 and therefore the second part 28 is less robust and can be more easily deformed.

The invention provides many advantages to the collection of honey from a hive. These may include:

A beehive that allows the honey to be removed from the hive without opening the hive. At the flick of a switch, or turn of a lever, honey comes flowing out of a tube connected to the hive.
A system that allows you to rob the honey from an entire apiary at the flick of a switch
A beehive that is built of plastic with all parts spaced perfectly and locked in position with no places for pests to hide and no spaces for brace or bir comb to be built.
A beehive that that includes all the known pest control methods. eg. Mite brush in entrance and beetle and mite traps on the bottom board.
A folding landing board that gives more room for landing and also acts as a closure for transport.
A beehive where the bees are hardly disturbed when the honey is robbed. Almost no bees die.
A bee hive with a bee feeder built into the lid. The feeder can also be used for medication.
Method for heating the honey in the hives without heating the bees. This allows the honey to flow easily and more quickly.
A system allowing an entire apiary to stay on a truck or trailer allowing it to be easily moved without the manual labor of shifting the hives on their own.
A control unit allowing the honey production of each hive to be monitored. This gives early detection of weak or diseased hives.
90% (or more) less labor. No need to open hives, smoke bees, remove frames, transport to processing shed, cut off capping, extract with centrifuge, transport back to hive and put the frames back, and then clean up.
Less equipment needed. No need for the honey shed, decapping machine and extracting machine
No Mess and no waste.
Fewer pest problems.
More production as bees don't have to make as much wax or do as much repair work from damage during traditional robbing. Bees use 7 kg of honey to make 1 kg of wax.
Can rob from a distance at the flick of a switch or automated avoiding the need for a smoker and bee suit and avoiding stings.
Robust, all frames are locked firmly in place for trouble free transport.
Automatable. Can run on auto pilot. Systems can be set up to send a message to the honey tanker when the honey tank is full for collecting. Web cams to monitor the system may also be provided.
Measurable. Load cells can give information on honey production and therefore hive condition Hive can be robbed more often and automatically as soon as full, Increasing production and negating the need for tall stacks of hives.

Can rob any time of day in any weather.

Higher return on investment then current beekeeping.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

Features, integers, characteristics, or groups described herein in conjunction with a particular aspect, embodiment or example of the invention are to be understood to be applicable to any other aspect, embodiment or example described herein unless incompatible therewith.

The invention claimed is:

1. An artificial honeycomb for use in a beehive and which enables honey to be removed from the honeycomb without removing the honeycomb from the beehive, the artificial honeycomb comprising a frame lying in a longitudinal plane of the honeycomb and defining a front face of the honeycomb, a back face of the honeycomb, and sidewalls of the frame therebetween; and cells having side walls perpendicular to the front face and the back face of the honeycomb and each extending entirely therebetween; the side walls formed of at least two parts which are moveable relative to each other between a cell formed position where a position of the side walls enables bees to fill the cell with honey, and a cell open position where at least some of the side walls have moved so that honey flows from the honeycomb in a downward lateral direction to the cells for a depth of the cells that is transverse to the downward lateral direction.

2. The honeycomb of claim 1, wherein a first part of the at least two parts and a second part of the at least two parts are slideable between the cell formed position and the cell open position.

3. The honeycomb of claim 1, wherein the at least two parts are slidable along a plane perpendicular to an end wall.

4. The honeycomb of claim 3, wherein the end wall of each cell is split.

5. The honeycomb of claim 1, wherein each of the cells is elongate and split longitudinally along a base, the base being defined by part of the side walls.

6. The honeycomb of claim 1, wherein two of the at least two parts comprise the side walls of the cells.

7. The honeycomb of claim 1, wherein each of the cells is split along a plane perpendicular to an end wall.

8. The honeycomb of claim 7, wherein each of the cells is bisected by the plane perpendicular to an end wall.

9. The honeycomb of claim 1, wherein the cells are arranged in columns in the cell formed position, and wherein vertically aligned cells in each of the columns join together to form a continuous channel in the cell open position.

10. The honeycomb of claim 9, wherein the continuous channel is serpentine.

11. The honeycomb of claim 1, wherein the relative movement between the at least two parts of the honeycomb causes honey to drain downward along a channel formed by the at least two parts.

12. The honeycomb of claim 1, wherein the relative movement between the at least two parts of the honeycomb causes breaching or opening of the cells in the honeycomb so that honey passes between adjacent breached or opened cells.

13. The honeycomb of claim 12, wherein the honey moves from upper breached or opened cells to lower breached or opened cells.

* * * * *